US009644942B2

(12) United States Patent
Nakano et al.

(10) Patent No.: US 9,644,942 B2
(45) Date of Patent: May 9, 2017

(54) METHOD AND APPARATUS FOR LASER PROJECTION, AND MACHINING METHOD

(71) Applicant: MITSUBISHI HITACHI POWER SYSTEMS, LTD., Yokohama, Kanagawa (JP)

(72) Inventors: Hiroyuki Nakano, Tokyo (JP); Nobuhisa Seya, Tokyo (JP); Daisuke Igarashi, Tokyo (JP); Kazuhiro Igarashi, Tokyo (JP); Youhei Maekawa, Tokyo (JP); Katsuto Numayama, Tokyo (JP)

(73) Assignee: Mitsubishi Hitachi Power Systems, Ltd., Kanagawa (JP)

(*) Notice: Subject to any disclaimer, the term of this patent is extended or adjusted under 35 U.S.C. 154(b) by 435 days.

(21) Appl. No.: 14/079,515

(22) Filed: Nov. 13, 2013

(65) Prior Publication Data

US 2014/0148939 A1  May 29, 2014

(30) Foreign Application Priority Data

Nov. 29, 2012 (JP) ................................. 2012-260466
Mar. 1, 2013 (JP) ................................. 2013-040670

(51) Int. Cl.
  *G05B 19/18* (2006.01)
  *G01B 11/00* (2006.01)
  (Continued)

(52) U.S. Cl.
  CPC ........ *G01B 11/002* (2013.01); *B23Q 17/2233* (2013.01); *B23Q 17/2414* (2013.01);
  (Continued)

(58) Field of Classification Search
  CPC ............ B23Q 17/2233; B23Q 17/2414; B23Q 17/2428; B23Q 17/2461; B23Q 17/2466;
  (Continued)

(56) References Cited

U.S. PATENT DOCUMENTS 5,180,957 A * 1/1993 Matsuura ............. B23Q 35/123
                                                          318/570
5,331,275 A * 7/1994 Ozaki .................... B82Y 35/00
                                                          324/750.22
(Continued)

FOREIGN PATENT DOCUMENTS

EP   2 163 847 A1   3/2010
EP   2 305 417 A2   4/2011
(Continued)

OTHER PUBLICATIONS

Partial European Search Report received in European Application No. 13192864 dated Feb. 6, 2014.
(Continued)

*Primary Examiner* — Ramesh Patel
(74) *Attorney, Agent, or Firm* — Mattingly & Malur, PC

(57) ABSTRACT

A laser projection method including the steps of: irradiating, from a laser projection unit, a workpiece that is a measurement object, with a laser while controlling a plurality of mirror angles; imaging the workpiece with a stereo camera, extracting a contour of the workpiece, and calculating a three-dimensional coordinate; calculating a positional relationship between the laser projection unit and the workpiece by comparing the calculated three-dimensional coordinate of the workpiece contour with the minor angle; and performing coordinate transformation of CAD data information and drawing CAD data from the laser projection unit to the workpiece, based on the positional relationship between the laser projection unit and the workpiece. The machining method including the steps of: selecting a component of a tool; assembling the component; imaging the tool assembled; and determining whether or not a desired tool has been assembled.

4 Claims, 31 Drawing Sheets

(51) Int. Cl.
*G01B 11/25* (2006.01)
*B23Q 17/22* (2006.01)
*B23Q 17/24* (2006.01)
*G05B 19/401* (2006.01)
*G05B 19/4097* (2006.01)

(52) U.S. Cl.
CPC ..... *B23Q 17/2428* (2013.01); *B23Q 17/2457* (2013.01); *B23Q 17/2461* (2013.01); *B23Q 17/2466* (2013.01); *G01B 11/25* (2013.01); *G01B 11/2513* (2013.01); *G01B 11/2545* (2013.01); *G05B 19/401* (2013.01); *G05B 19/4097* (2013.01); *G05B 2219/31048* (2013.01); *G05B 2219/35134* (2013.01); *G05B 2219/37205* (2013.01); *G05B 2219/37288* (2013.01); *G05B 2219/37571* (2013.01); *G05B 2219/41168* (2013.01); *G05B 2219/45165* (2013.01); *Y02P 90/04* (2015.11); *Y02P 90/265* (2015.11)

(58) Field of Classification Search
CPC .............. G05B 19/401; G05B 19/4097; G05B 2219/37571; G05B 2219/37205; G05B 2219/37288; G05B 2219/4116; G01B 11/2513; G01B 11/2545; Y02P 90/265; Y02P 90/04
See application file for complete search history.

(56) References Cited

U.S. PATENT DOCUMENTS

| | | | | |
|---|---|---|---|---|
| 5,594,768 A * | 1/1997 | Fujii | ............ | G01N 23/046 378/21 |
| 6,547,397 B1 * | 4/2003 | Kaufman | ............ | G01B 11/002 353/122 |
| 6,556,307 B1 * | 4/2003 | Norita | ............ | G01B 11/2518 356/608 |
| 6,809,801 B2 * | 10/2004 | Voutsas | ............ | G02B 13/26 257/E21.133 |
| 7,127,098 B2 * | 10/2006 | Shimoda | ............ | G01N 21/95684 250/208.1 |
| 7,241,981 B2 * | 7/2007 | Hofmann | ............ | B28D 1/043 250/201.1 |
| 7,306,339 B2 * | 12/2007 | Kaufman | ............ | G01B 11/2518 353/122 |
| 7,417,721 B2 * | 8/2008 | Uto | ............ | G01N 21/9501 356/237.2 |
| 7,502,125 B2 * | 3/2009 | Suzuki | ............ | G01B 11/2527 356/603 |
| 7,701,592 B2 * | 4/2010 | Saint Clair | ............ | G01B 11/002 356/5.11 |
| 7,800,013 B2 * | 9/2010 | Chen | ............ | B23K 26/0084 219/121.62 |
| 8,118,438 B2 * | 2/2012 | Daniel | ............ | G03B 21/26 353/119 |
| 8,208,188 B2 * | 6/2012 | Uchikawa | ............ | G02B 26/101 359/201.1 |
| 8,269,970 B2 * | 9/2012 | Polidor | ............ | G01B 9/08 356/392 |
| 8,483,444 B2 * | 7/2013 | Aikawa | ............ | G01B 11/026 382/106 |
| 2001/0017699 A1 * | 8/2001 | Egelhof | ............ | B23Q 17/09 356/601 |
| 2002/0036779 A1 * | 3/2002 | Kiyoi | ............ | G01B 11/24 356/606 |
| 2003/0053676 A1 * | 3/2003 | Shimoda | ............ | G01N 21/95684 382/145 |
| 2003/0210407 A1 * | 11/2003 | Xu | ............ | G01B 11/2545 356/611 |
| 2005/0129304 A1 * | 6/2005 | Sasazawa | ............ | G01B 11/0608 382/150 |
| 2006/0124874 A1 * | 6/2006 | Uto | ............ | G01N 21/9501 250/559.45 |
| 2007/0124949 A1 | 6/2007 | Burns et al. | | |
| 2012/0099798 A1 * | 4/2012 | Saruta | ............ | G01B 11/002 382/203 |
| 2012/0154784 A1 * | 6/2012 | Kaufman | ............ | G01B 11/2518 356/4.01 |

FOREIGN PATENT DOCUMENTS

| | | |
|---|---|---|
| JP | 61-178141 A | 8/1986 |
| JP | 64-34629 A | 2/1989 |
| JP | 6-134638 A | 5/1994 |
| JP | 06-61668 B2 | 8/1994 |
| JP | 9-85584 A | 3/1997 |
| JP | 2001-269844 A | 10/2001 |
| JP | 2001-523828 A | 11/2001 |
| JP | 2005-324262 A | 11/2005 |
| WO | 94/02284 A1 | 2/1994 |
| WO | 2012/033892 A1 | 3/2012 |

OTHER PUBLICATIONS

European Search Report received in European Application No. 13192864 dated Jun. 10, 2014.
Japanese Office Action received in corresponding Japanese Application No. 2012-260466 dated Jun. 14, 2016.
Japanese Office Action received in corresponding Japanese Application No. 2013-040670 dated Jun. 28, 2016.

* cited by examiner

FIG. 40

| ITEM | TOOL NUMBER | SHANK TYPE NUMBER | CHIP TYPE NUMBER | DIAMETER (D) | LENGTH (L) | TOOL IMAGE | ACTUAL TOOL |
|---|---|---|---|---|---|---|---|
| DESIGN INFORMATION | T10 | A10 | B6 | (10.00) | (120.00) | {IMAGE GROUP T10} | — |
| TOOL MEASUREMENT INFORMATION | | | | 10.05 | 120.02 | | T10 |
| INFORMATION WRITTEN TO LABEL/TAG | T10 | A10 | B6 | 10.05 | 120.02 | | |
| INFORMATION READ BY TOOL INFORMATION READ UNIT A | T10 | A10 | B6 | 10.05 | 120.02 | | T10 |

FIG. 41

| ITEM | TOOL NUMBER | SHANK TYPE NUMBER | CHIP TYPE NUMBER | DIAMETER (D) | LENGTH (L) | TOOL IMAGE | ACTUAL TOOL |
|---|---|---|---|---|---|---|---|
| DESIGN INFORMATION | T10 | A10 | B6 | (10.00) | (120.00) | {IMAGE GROUP T10} | — |
| TOOL MEASUREMENT INFORMATION | | | | 10.05 | 120.02 | | T10 |
| INFORMATION WRITTEN TO LABEL/TAG | T10 | A10 | B6 | 10.05 | 120.02 | | |
| INFORMATION READ BY TOOL INFORMATION READ UNIT A | T10 | A10 | B6 | 10.05 | 120.02 | | T15 |

FIG. 42

| ITEM | TOOL NUMBER | SHANK TYPE NUMBER | CHIP TYPE NUMBER | DIAMETER (D) | LENGTH (L) | TOOL IMAGE | ACTUAL TOOL |
|---|---|---|---|---|---|---|---|
| DESIGN INFORMATION | T10 | A10 | B6 | (10.00) | (120.00) | {IMAGE GROUP T10} | - |
| TOOL MEASUREMENT INFORMATION | | | | 10.05 | 120.02 | | T10 |
| INFORMATION WRITTEN TO LABEL/TAG | T10 | A10 | B6 | 10.05 | 120.02 | | |
| INFORMATION READ BY TOOL INFORMATION READ UNIT A | T10 | A10 | B6 | 10.05 | 120.02 | | T15 |
| INFORMATION READ BY TOOL INFORMATION READ UNIT B | T15 | | | | | {IMAGE GROUP T15} | T15 |

FIG. 43

| ITEM | TOOL NUMBER | SHANK TYPE NUMBER | CHIP TYPE NUMBER | DIAMETER (D) | LENGTH (L) | TOOL IMAGE | ACTUAL TOOL |
|---|---|---|---|---|---|---|---|
| DESIGN INFORMATION | T10 | A10 | B6 | (10.00) | (120.00) | {IMAGE GROUP T10} | — |
| COMPREHENSIVE INFORMATION | T10 | A10 | B6 | 10.05 | 120.02 | {IMAGE GROUP T10} | T10 |

METHOD AND APPARATUS FOR LASER PROJECTION, AND MACHINING METHOD

BACKGROUND OF THE INVENTION

The present invention relates to methods and apparatuses for laser projection. Moreover, the present invention is directed to machining methods for machining a workpiece using a working machine, and in particular relates to a machining method suitable for confirming a tool attached to a working machine.

Machining by an NC (Numerical Control) processing machine automatically proceeds in accordance with an NC program. Once machining starts, the progress of machining in accordance with an NC program is advantageous from a view point of an improvement in machining efficiency and the like, but if there is an error in the NC program, there is a problem that machining will progress without noticing the error. In order to accurately perform machining, an operator of a processing machine may input a correction numerical value in the middle of machining. In this case, for example if the operator inputs a wrong numerical value, there is a risk that wrong machining is performed as is. Furthermore, after all the machining operations are complete, there is a need to determine whether all the drawing-specified regions have been accurately machined. However, for example if there are many regions to be machined, there is a problem that a confirmation work takes time and/or a risk of overlooking an un-machined region.

In light of these problems, there are proposed a method and apparatus for determining, by projecting design information on a workpiece with a laser beam and confirming a projected laser locus by a person, whether machining as specified by design has been performed at a design specified position.

For example, Kaufman et al. describes, in U.S. Pat. No. 6,547,397, a laser drawing apparatus that scans a laser beam with two galvanomirrors. Kaufman et al. also describes, in U.S. Pat. No. 7,306,339, a method comprising the steps of: projecting a laser beam of a laser drawing apparatus onto a characteristic region of a workpiece; detecting a laser beam spread and reflected from the characteristic region of this workpiece; thereby recognizing a position (reference point on the workpiece) of the characteristic region of the workpiece; thereby recognizing a positional relationship between the workpiece and the laser drawing apparatus; and drawing design information or the like on the workpiece.

As a first example of a conventional machining method, for the purpose of removing a drawback of a lot of time required for setting a tool to an ATC (Automatic Tool Changer) and/or confirming the tool set in the ATC, and for simplifying this confirmation, there is known a working machine's tool management system capable of automatically managing tools without a person and of realizing automation of tool management (e.g., see Japan Patent No. 1931433). Specifically, the working machine's tool management system comprises: a working machine having tools of different shapes; a tool selection/drive control device for selecting a tool of this working machine; a tool recognition device for recognizing the shape of a tool; a central control unit that controls a tool recognition procedure, calculates tool recognition information of this tool recognition device, and controls the tool selection/drive control device; and a tool data generation device for preparing tool selection information, wherein the recognition information by the tool recognition device and tool data of the tool data generation device are compared and managed.

Secondly, there are known a tool observation method, a device therefor, and a cutting work system for accurately imaging a tool on machine with a tool observation technique of a cutting work device and for managing the tool based on this image (e.g., see JP-A-2001-269844). Specifically, there is provided the tool observation method comprising the steps of: imaging a state of a tool for cutting a workpiece, with an imaging unit; and observing the tool based on this image information, wherein a plurality of images of the workpiece are captured while rotating or moving the tool at least before or after machining the workpiece with the tool, and wherein a focused image among the plurality of images is selectively used for observation.

Thirdly, a tool management device in a working machine is known, which eliminates a work for confirming tool storage positions in a tool magazine where a plurality of tools are to be stored, the work being performed by an operator, and which quickly and reliably performs the work for storing the tools into the tool magazine (e.g., see JP-A-2005-324262). Specifically, a normal tool is imaged and stored into a first tool image data storage unit. Next, tool management information including a tool number relating to first tool image data is stored into a first tool management information storage unit. Then, a plurality of tools to be used are randomly mounted on the tool magazine without taking a machining sequence into consideration, and the tools are imaged and stored into a second tool image data storage unit. Further, second tool image data is collated with the first tool image data. If the both data coincide with each other, the tool management information including the tool number of the first tool image data is set as tool management information of the second tool image data. Furthermore, by analyzing a machining program, the storage positions of the tools in the tool magazine are shuffled so as to minimize a total machining time.

Fourthly, there is known an apparatus capable of finding automatically and in advance a mounting mistake of a tool T onto a magazine 1 and furthermore realizing automatic measurement and automatic correction of a high precision tool T (e.g., see JP-A-6-134638). Specifically, a captured image of the tool T1 is transferred as image information to an image processing unit 8a of a personal computer 8 from an imaging unit 5. This image information is processed in an image processing unit 8a, and then sent to a tool feature quantity calculation unit 8b. The tool feature quantity calculation unit 8b extracts and calculates a feature quantity of the tool T1 from this image data. Then, a collation and recognition unit 8c collates the feature quantity data of the tool T1 extracted and calculated by the tool feature quantity calculation unit 8b with master data P1 regarding the tool T1 to recognize whether or not an imaged tool T1 coincides with a tool T1 specified by an NC apparatus 3.

SUMMARY OF THE INVENTION

However, with the techniques described in U.S. Pat. Nos. 6,547,397 and 7,306,339, a person needs to judge a laser projection result by eye, and such a degree of determination of whether or not machining is omitted is possible by eye. However, it is difficult to accurately determine whether or not a machining position is correct and whether or not a machining dimension is correct.

Japan Patent No. 1931433 (corresponding to JP-B-H6-61668 or JP-A-S61-178141) describes a system which recognizes the shape of a tool set in an ATC and compares and manages the recognized information and the tool data of a tool data generation device, thereby managing the tool, but does not describe a method for determining whether or not a tool used in machining is a desired tool.

JP-A-2001-269844 describes a system, in which a tool on machine is accurately imaged, and based on this image, the life of the tool is judged by operator's eyes and/or tool dimensions are measured by image processing, but does not describe a method for determining whether or not a tool used in machining is a desired tool.

JP-A-2005-324262 describes a tool management device, in which first a normal tool is imaged to acquire first tool image data, and then tool management information including a tool number related to the first tool image data is added, next a plurality of tools to be used are randomly mounted on a tool magazine without taking a machining sequence into consideration, and a tool after being mounted is imaged to acquire second tool image data, and then the first image data is collated with the second tool image data to automatically determine which tool is stored into which magazine, and thereafter by analyzing a machining program, the storage positions of the tools in the tool magazine are shuffled so as to minimize a total machining time. However, JP-A-2005-324262 does not describe a method for determining whether or not a tool used in machining is a desired tool.

JP-A-6-134638 describes a tool automatic collation/recognition device having a function to image a tool T1 stored in a magazine and extract and calculate a feature quantity of the tool T1 from image information of the tool T1, and subsequently collate the feature quantity data of the tool T1 with master data P1 regarding the tool T1 and thereby determine whether or not the imaged tool T1 coincides with the tool T1 specified by the NC unit 3. However, JP-A-6-134638 does not describe a method for determining whether or not a tool used in machining is a desired tool.

Then, an object of the present invention is to provide a method and apparatus for not only projecting design information on a workpiece using a laser beam but also easily performing comparative determination between the design information and a machining result on the workpiece. Another object of the present invention is to provide a machining method capable of machining after determining whether or not a tool used in machining is a desired tool.

A laser projection method of the present invention includes: a first step of irradiating, from a laser projection unit, a workpiece that is a measurement object, with a laser while controlling a plurality of mirror angles; a second step of imaging the workpiece with a stereo camera, extracting a contour of the workpiece, and calculating a three-dimensional coordinate; a third step of calculating a positional relationship between the laser projection unit and the workpiece by comparing the three-dimensional coordinate of the workpiece contour calculated in the second step with the mirror angle; and a fourth step of performing coordinate transformation of CAD data information and drawing CAD data to the workpiece from the laser projection unit, based on the positional relationship between the laser projection unit and the workpiece calculated in the third step.

Moreover, a laser projection apparatus of the present invention comprises: a laser projection unit to irradiate a workpiece that is a measurement object, with a laser while controlling a plurality of mirror angles; an image capturing unit to image the workpiece with a stereo camera and take in a captured image; an image processing unit to extract a contour of the workpiece from the image; a coordinate calculation unit to calculate a three-dimensional coordinate; a relative positional relationship calculation unit to compare a calculated three-dimensional coordinate of the contour of the workpiece with the mirror angle and calculate a positional relationship between the laser projection unit and the workpiece; and a CAD data conversion unit to perform coordinate conversion of CAD data information, based on the positional relationship between the laser projection unit and the workpiece calculated by the relative positional relationship calculation unit.

Moreover, a machining method of the present invention includes: a first step of selecting a component of a tool; a second step of assembling the component selected in the first step; a third step of imaging the tool assembled in the second step; and a fourth step of determining, by collating a collation image, which is prepared in advance from an image of a tool having a correct component correctly assembled therein, with an image captured after assembly in the third step, whether or not a desired tool has been assembled. With such a method, machining can be performed after determining whether or not a tool used in machining is a desired tool.

According to the method and apparatus for laser projection of the present invention, a method and apparatus can be provided, for not only projecting design information on a workpiece using a laser beam but also easily performing comparative determination between design information and a machining result on the workpiece. Moreover, according to the machining method of the present invention, machining can be performed after determining whether or not a tool used in machining is a desired tool.

Other objects, features and advantages of the invention will become apparent from the following description of the embodiments of the invention taken in conjunction with the accompanying drawings.

BRIEF DESCRIPTION OF THE DRAWINGS

FIG. 40 is an explanatory view of how to confirm a tool in the working machine that performs the machining method according to an embodiment of the present invention.

FIG. 41 is an explanatory view of how to confirm a tool in the working machine that performs the machining method according to an embodiment of the present invention.

FIG. 42 is an explanatory view of how to confirm a tool in the working machine that performs the machining method according to an embodiment of the present invention.

FIG. 43 is an explanatory view of how to confirm a tool in the working machine that performs the machining method according to an embodiment of the present invention.

DESCRIPTION OF THE EMBODIMENTS

A method and apparatus for laser projection of the present invention relate to methods and apparatuses for drawing design information on a workpiece using a laser beam. Hereinafter, an embodiment of the method and apparatus for laser projection of the present invention is described using FIG. 1 to FIG. 20.

Figure 1:
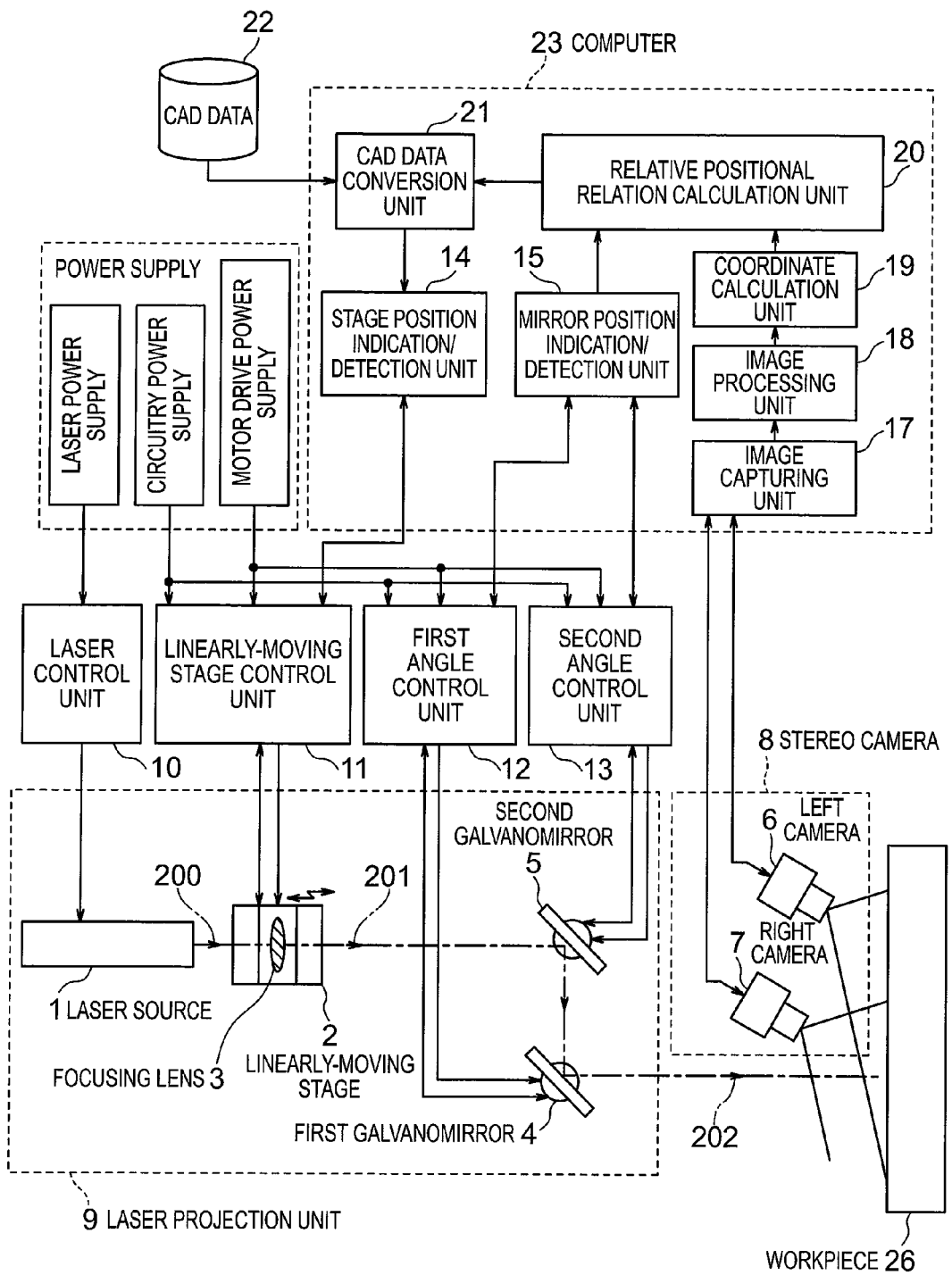
FIG. 1 is a view showing a system configuration in an embodiment of the present invention.

FIG. 1 shows the entire configuration of a laser projection system having a coordinate detection function in the embodiment of the present invention. A laser source 1 is coupled to a laser control unit 10, and is supplied with electric power from a laser power supply 23 via the laser control unit 10. Moreover, the laser source 1 oscillates or stops in accordance with an instruction from a mirror position indication/detection unit 15. As a specific example, for example in drawing two circles, in the middle of moving from a first circle to a second circle, the oscillation of a laser is stopped so that two circles are drawn individually.

A laser beam 200 oscillated from the laser source 1 is focused by a focusing lens 3 at a desired distance. In order to focus the beam at a desired distance, the focusing lens 3 is mounted on a linearly-moving stage 2 that linearly moves in an optical axis direction. The position of the linearly-moving stage 2 is controlled by a linearly-moving stage control unit 11. Specifically, the position of the linearly-moving stage is calculated and controlled by a linearly-moving stage position indication/detection unit 14 so that the laser beam is focused at a laser drawing position determined by a CAD (Computer Aided Design) data conversion unit 21 to be described later and so that the linearly-moving stage moves to a calculated position. Note that the linearly-moving stage 2 is supplied with electric power from a motor drive power supply 25 via the linearly-moving stage control unit 11. Moreover, the linearly-moving stage control unit 11 is supplied electric power also from a circuitry power supply 24.

A focused beam 201 emitted from the focusing lens 3 is projected on a workpiece via a first galvanomirror 4 and a second galvanomirror 5. The angles of the first galvanomirror 4 and second galvanomirror 5 are controlled by a first angle control unit 12 and a second angle control unit 13, respectively. Specifically, a first angle and a second angle are calculated by the mirror position indication/detection unit 15 so that the focused beam 201 travels toward a laser drawing position determined by the CAD data conversion unit 21 to be described late, and the first galvanomirror 4 and the second galvanomirror 5 are controlled so as to rotate to the calculated angles, respectively. The first galvanomirror 4 and the second galvanomirror 5 are supplied with electric power from the motor drive power supply 25 via the first angle control unit 12 and the second angle control unit 13. Moreover, the first angle control unit 12 and the second angle control unit 13 are supplied with electric power also from the circuitry power supply 24.

Next, a coordinate detection unit is described. In this embodiment, the coordinate detection unit comprises a stereo camera. A stereo camera 8 comprises a left camera 6 and a right camera 7. Images captured by the left camera 6 and the right camera 7 are acquired into a computer 23 via an image capturing unit 17. The acquired image is processed by an image processing unit 18, where contour extraction and the like to be described later are performed. Subsequently, a three-dimensional coordinate of an extracted contour is calculated by a coordinate calculation unit 19.

Here, the current positions (angles) of the first angle control unit 12 and second angle control unit 13 are continuously detected by the mirror position indication/detection unit 15. In a relative positional relationship calculation unit 20, the three-dimensional coordinate extracted by the coordinate calculation unit 19 is compared with the angles detected by the mirror position indication/detection unit 15 so as to calculate a relative positional relationship between the laser projection unit 9 and the stereo camera 8, a positional relationship between the stereo camera 8 and a workpiece 26, and furthermore a positional relationship between the laser projection unit 9 and the workpiece 26. In the CAD data conversion unit 21, based on the relative positional relationship between the laser projection unit 9 and the workpiece 26 calculated by the relative positional relationship calculation unit 20, information of CAD data 22 is subjected to coordinate conversion, thereby generating data that is drawn on the workpiece by the laser projection unit 9.

Next, this embodiment is described using FIG. 2 to FIG. 14.

Figure 2:
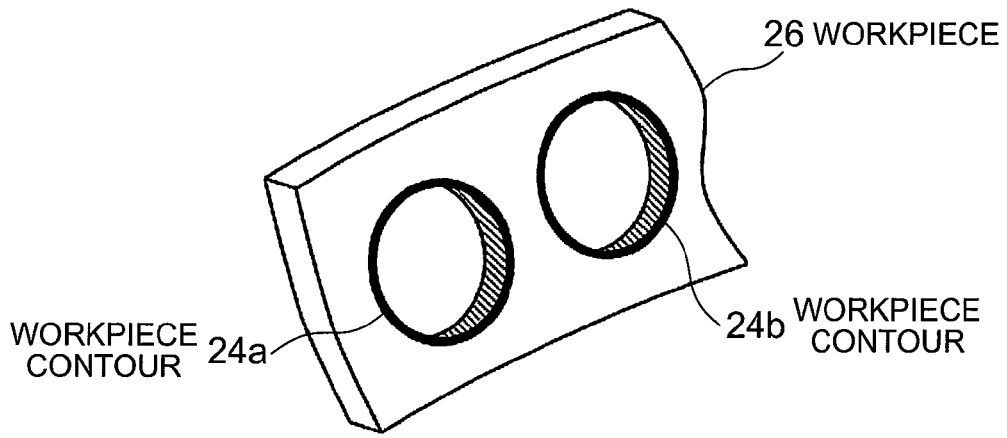
FIG. 2 shows a workpiece having a round hole machined therein.

FIG. 2 shows the workpiece 26 having two cylindrical bores machined at two places therein. The contours of the cylindrical bores are referred to as workpiece contours 24a and 24b.

Figure 3:
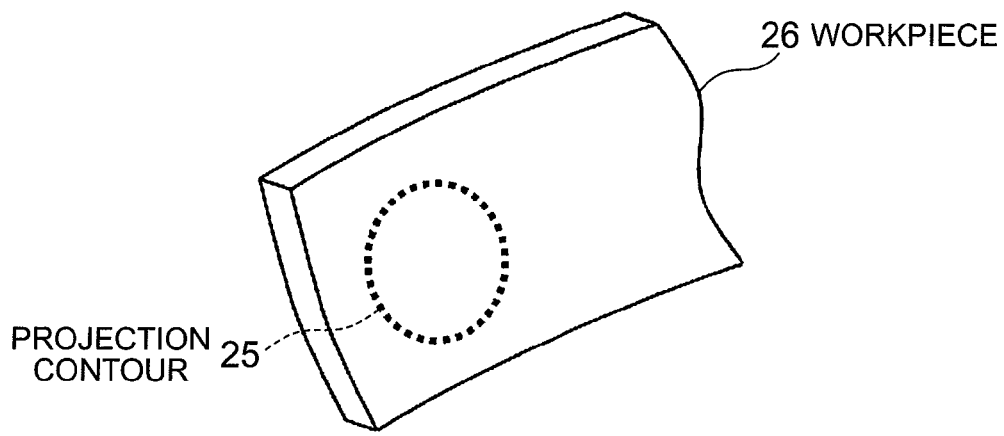
FIG. 3 is a view showing a state where design information is projected on a workpiece prior to machining, in the embodiment of the present invention.

FIG. 3 shows the workpiece 26 before the cylindrical bore is machined. Design data projected on the workpiece 26 is a projection contour 25. In this way, by projecting design data on an actual workpiece prior to machining, a final image of machining can be confirmed on an actual workpiece prior to machining. This is one of the effects of this embodiment.

Figure 4:
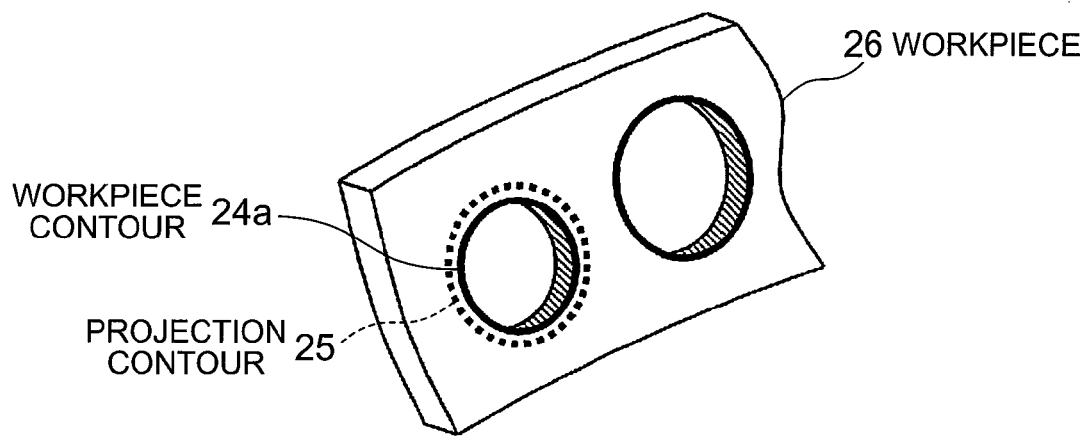
FIG. 4 is a view showing a state where design information is projected in the middle of machining a round hole, in the embodiment of the present invention.

FIG. 4 shows the workpiece 26 having therein the cylindrical bore halfway machined. By comparing the workpiece contour 24a with the projection contour 25, a machining remaining amount can be visually confirmed on an actual workpiece. This is one of the effects of this embodiment.

Figure 5:
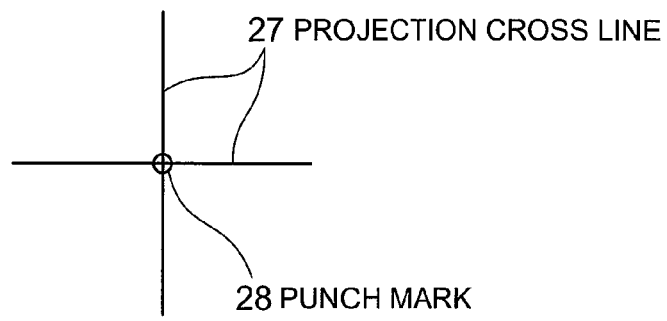
FIG. 5 is a view showing a state where a cross line is projected on a punch mark, in the embodiment of the present invention.

FIG. 5 shows a state where a cross line 27 is drawn at a punch mark 28 indicative of a machining position. In an NC processing machine, the NC processing machine itself punches prior to processing. As shown in FIG. 5, a machining position in design is projected to the machining punch mark 28, e.g., in the case of cylindrical bore machining, the cross line 27 is projected to the center of a circle, so that it can be determined prior to machining whether or not a machining punch position, i.e., a machining position input to an NC program, coincides with a position indicated by design, and thus wrong cutting, i.e., machining at a different position, can be obviated.

Figure 6:
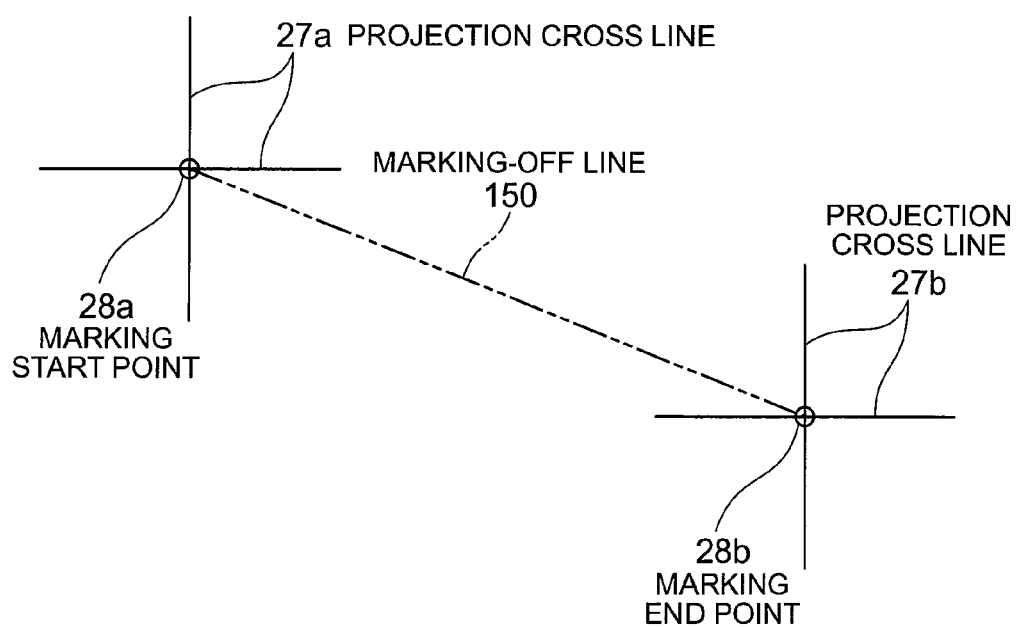
FIG. 6 is a view showing a state where a cross line is projected on a marking start point position and a marking end point position, in the embodiment of the present invention.

FIG. 6 shows a state where cross lines 27a and 27b are drawn, respectively, at a start point 28a and an end point 28b of a marking-off line serving as a reference for a machine work, respectively. By marking off with two intersections of these cross lines 27a and 27b as targets, it is possible to mark off at a correct position relative to a design-specified position. Alternatively, by determining, after marking off, whether or not two intersections of the cross lines 27a and 27b are on the marking-off line, whether or not the marking-off line has been drawn at a correct position relative to a design-specified position can be determined.

Figure 7:
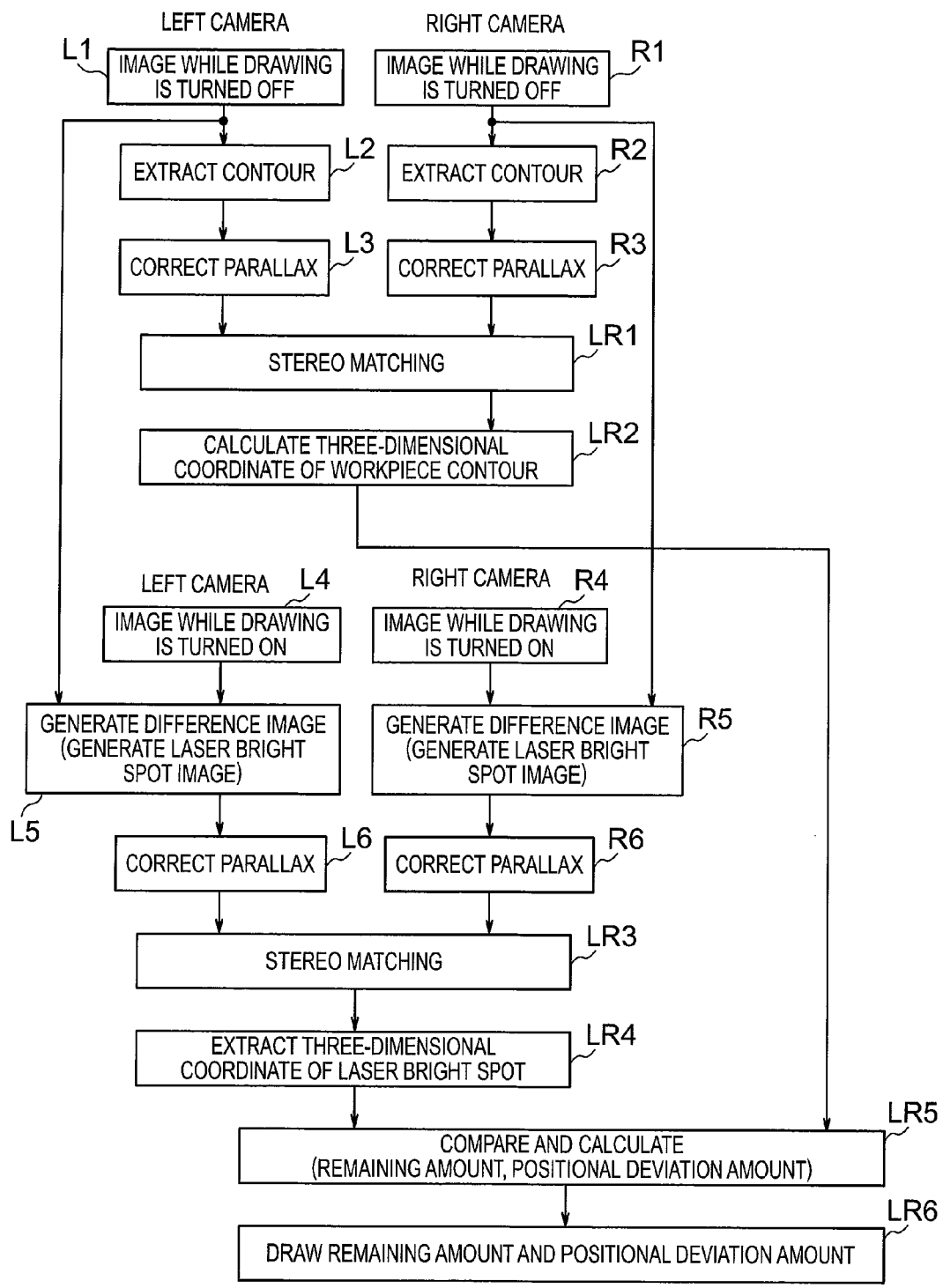
FIG. 7 is a view illustrating a procedure for comparing an actual contour with a projection contour, in the embodiment of the present invention.

In FIG. 7, a specific procedure for detecting a machining remaining amount and a machining positional deviation amount is described. First, an image is captured with the left camera and the right camera while laser drawing is turned off (L1, R1). Then, the contour of a workpiece is extracted (L2, R2), stereo matching is performed (LR1) after performing parallax correction (L3, R3), and the three-dimensional coordinate of the workpiece contour is calculated (LR2). Next, while laser drawing is turned on, an image is captured with the left camera and the right camera (L4, R4). Then, a difference image from the image, which is captured while laser drawing is turned off, is generated (L5, R5), and then stereo matching is performed (LR3) after performing parallax correction (L6, R6), and the three-dimensional coordinate of a laser drawing locus is calculated (LR4). Finally, by comparing the calculated three-dimensional coordinate of the workpiece contour with the three-dimensional coordinate of the laser drawing locus (LR5), a remaining amount and/or a machining positional deviation amount can be calculated (LR6).

Figure 8:
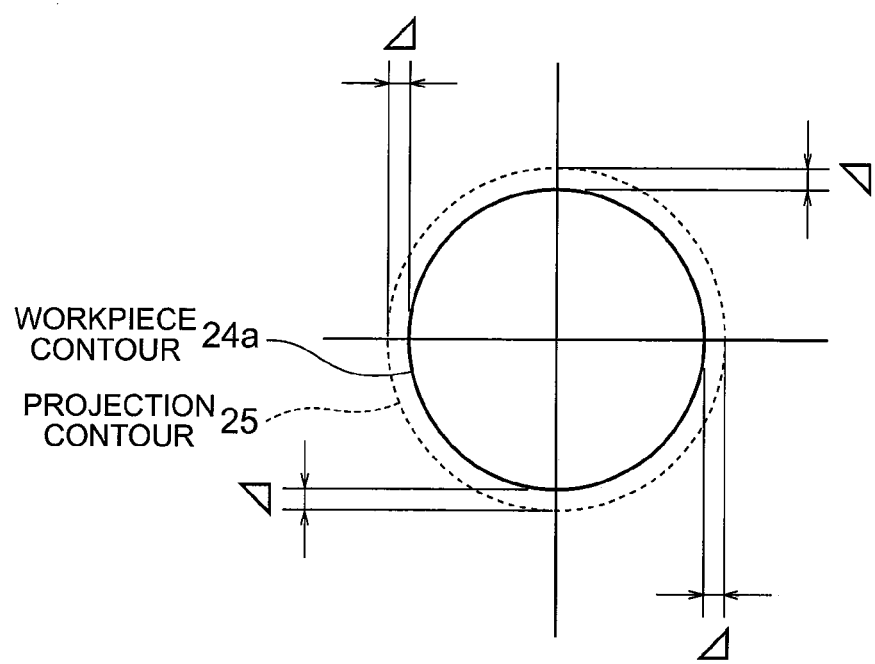
FIG. 8 is a view illustrating the definition of a remaining amount, in the embodiment of the present invention.
Figure 9:
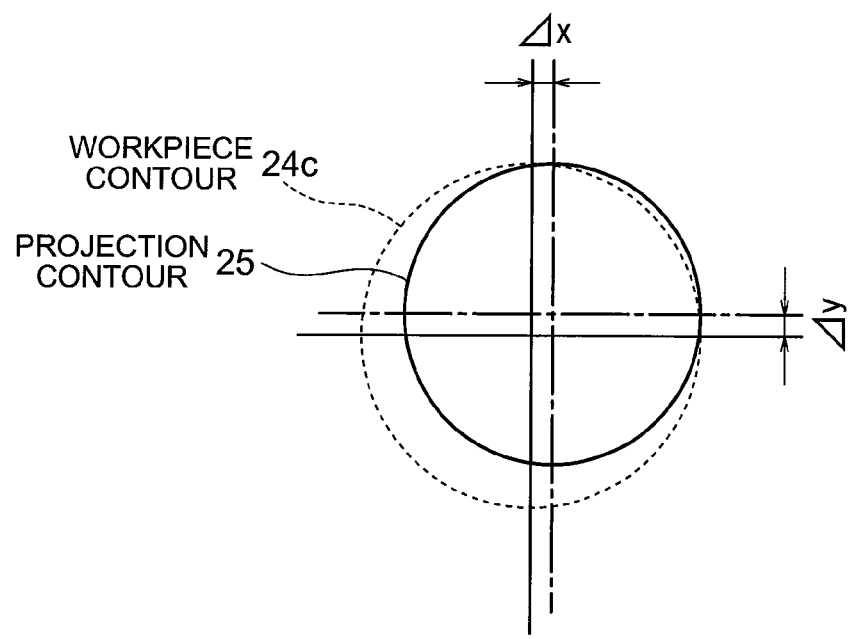
FIG. 9 is a view illustrating the definition of a deviation amount, in the embodiment of the present invention.

The remaining amount may be defined as shown in FIG. 8, for example. Moreover, the machining positional deviation amount may be defined as shown in FIG. 9.

Figure 10:
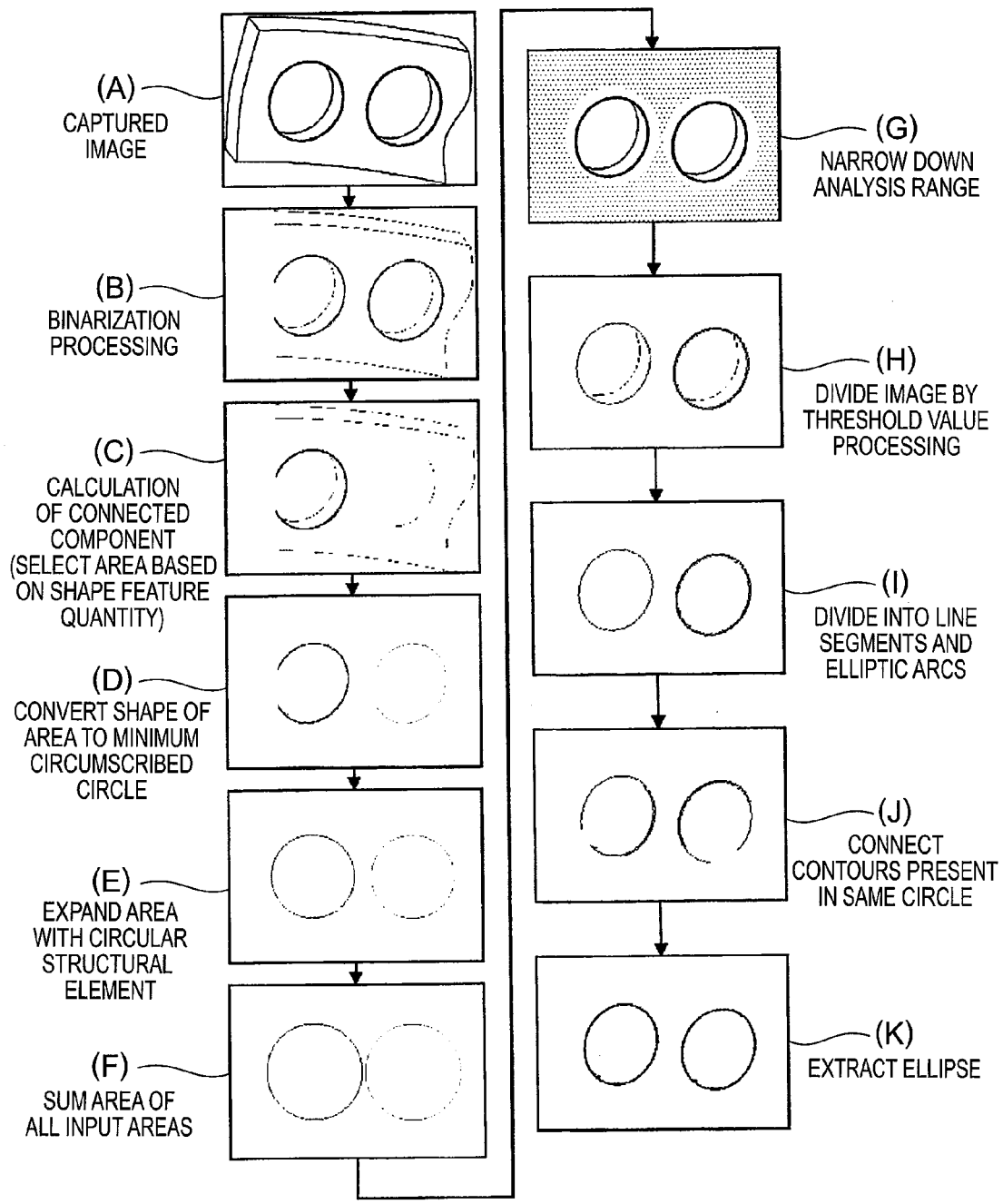
FIG. 10 is a view illustrating an image processing algorithm for extracting a circular contour, in the embodiment of the present invention.

Here, in order to extract an arc contour of a cylindrical bore, processing shown in FIG. 10 may be performed, for example. Specifically, first a captured image (FIG. 10A) is binarized (FIG. 10B), and subsequently a connected component is calculated (FIG. 10C). Specifically, area selection based on a shape feature quantity (in this embodiment, elliptic arc) will be performed. Next, the shape of the selected area is converted to a minimum circumscribed circle (FIG. 10D). Furthermore, the area is expanded with a circular structural element (FIG. 10E). Note that, in FIG. 10E, only two arcs are expressed, but actually in FIG. 10C the areas are finely selected, and therefore actually there are the same number of circular structural elements as the number of the selected areas. Then, a sum area of all areas is calculated (FIG. 10F). Then, as shown in FIG. 10G, an area (analysis area) including a desired workpiece contour is narrowed down. Subsequently, within this analysis area, the image is divided by threshold value processing (FIG. 10H), and further divided into line segments and elliptic arcs (including arcs) (FIG. 10I), and the contours present on the same circle are connected (FIG. 10J). Specifically, processing is performed, in which an ellipse is applied to the divided line segments and arcs, and the one whose center position and radius are within a certain range is regarded as the same circle. With the above-described processing, a desired workpiece contour can be extracted.

Figure 11:
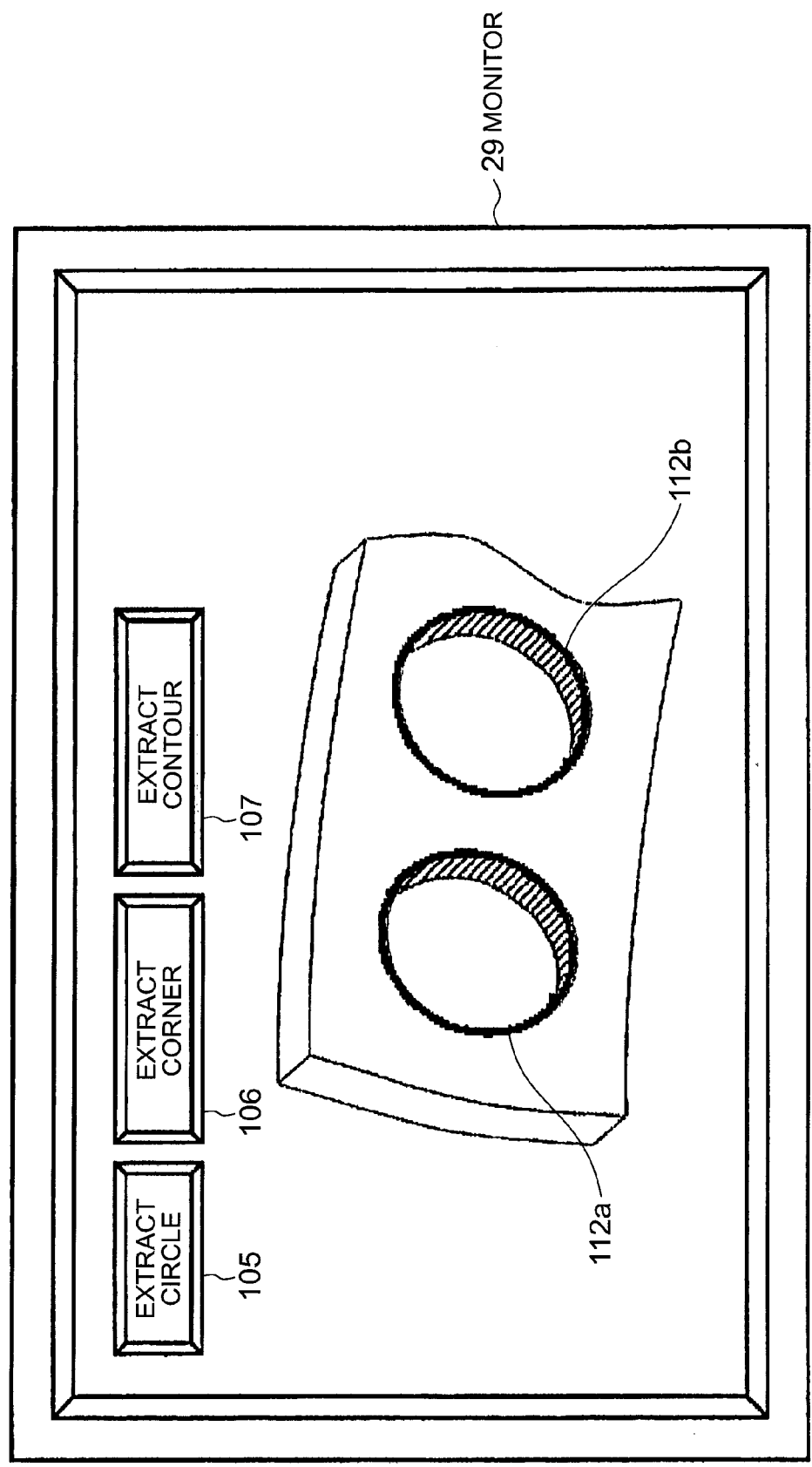
FIG. 11 is a view showing a state where an extraction result of the circular contour is superimposed on a stereo-camera image and displayed, in the embodiment of the present invention.
Figure 12:
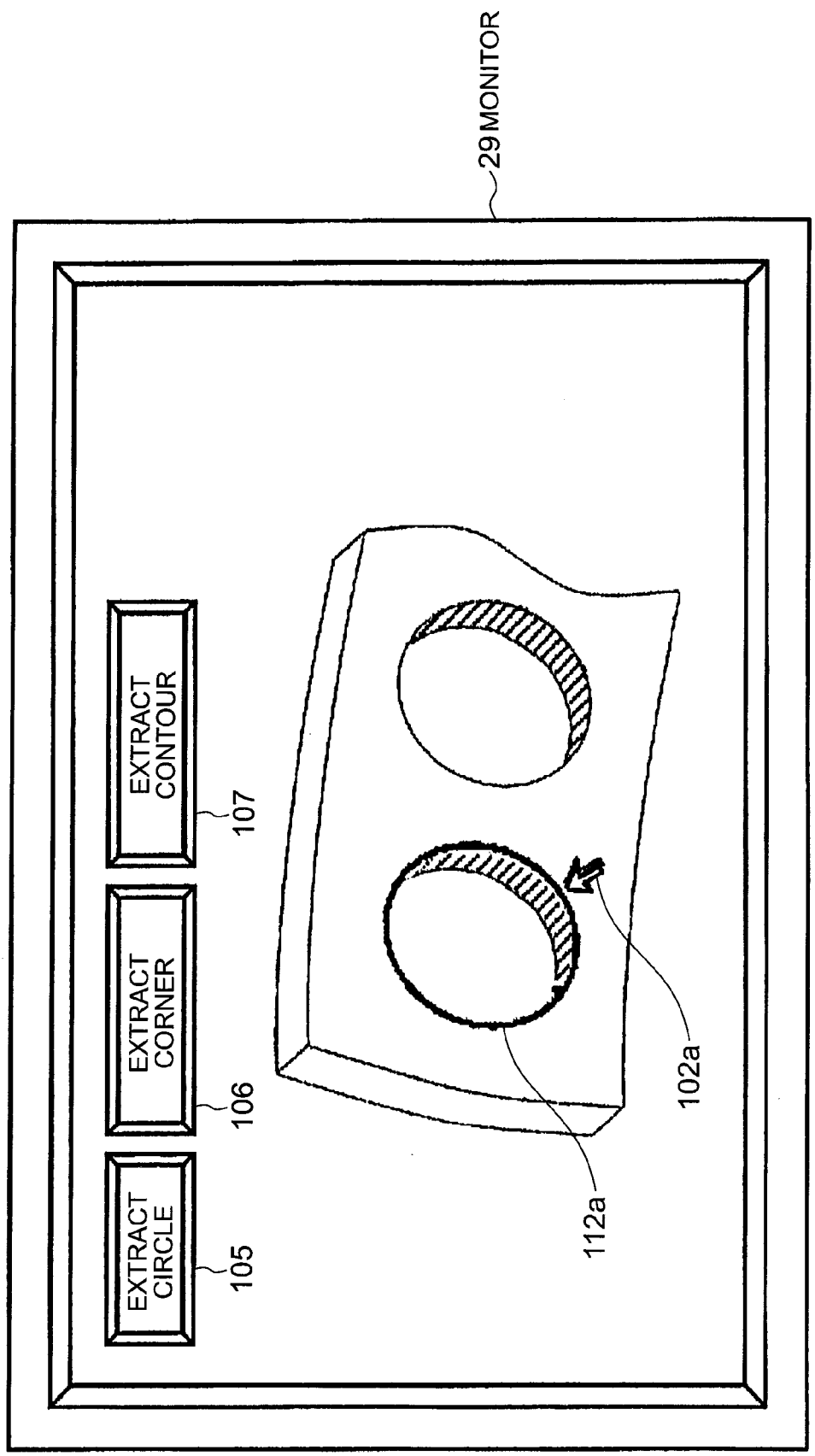
FIG. 12 is a view showing a state where only a desired contour is selected from a result of superimposing the extraction result of the circular contour on the stereo camera image and displaying the same, in the embodiment of the present invention.

In order for an operator to perform such processing, for example as shown in FIG. 11 the image may be displayed on a monitor 29 and when an operator depresses a contour extraction button 107, the above-described contour extraction processing may be performed and an extraction result may be displayed so as to be superimposed on the image. Here, if a plurality of (two, in the example of FIG. 11) desired workpiece contours have been extracted, then as shown in FIG. 12 a desired contour may be selected with a mouse pointer 102*a*.

Figure 13:
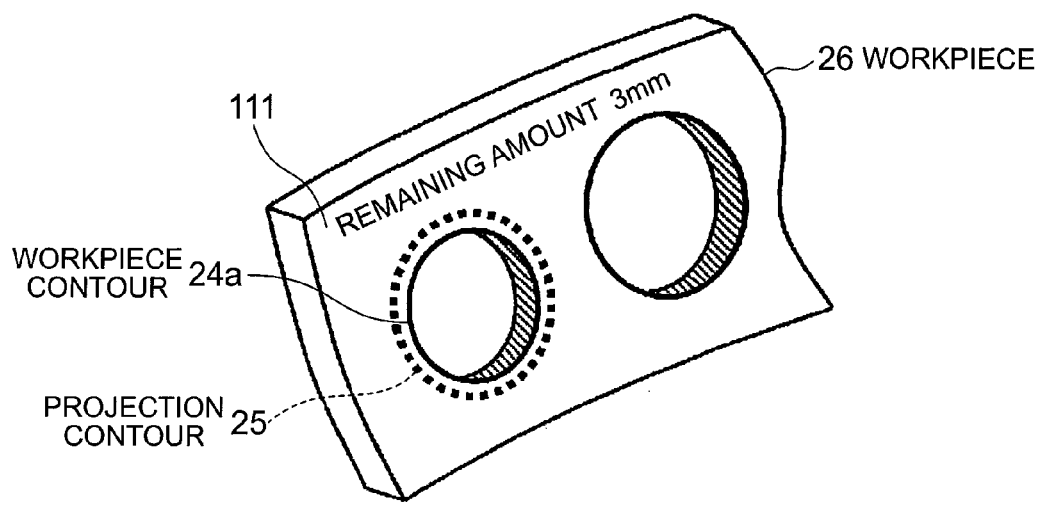
FIG. 13 is a view showing a state where a remaining amount calculation result is indicated on a workpiece by a text, in the embodiment of the present invention.
Figure 14:
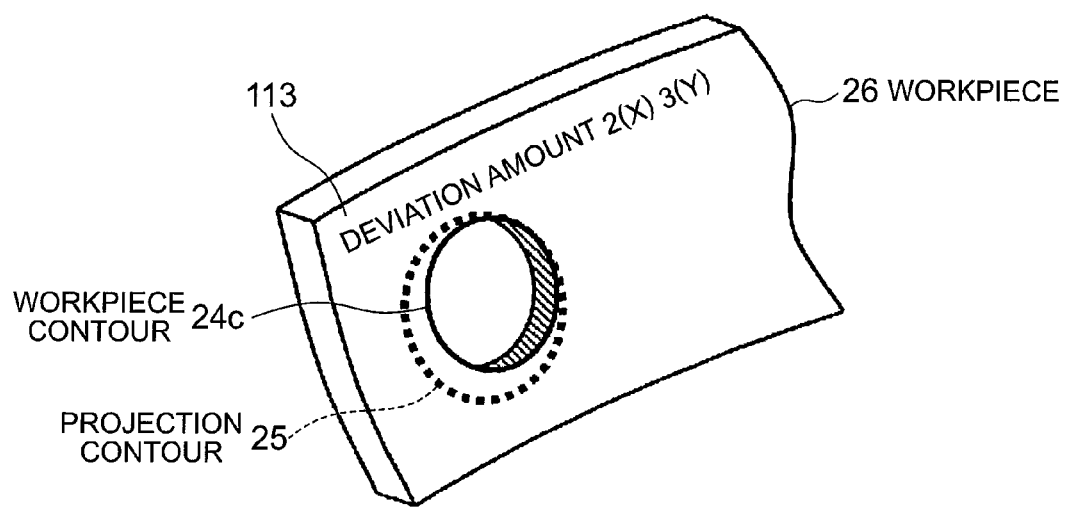
FIG. 14 is a view showing a state where a deviation amount calculation result is indicated on a workpiece by a text, in the embodiment of the present invention.

The laser projection unit can also draw a text, and therefore as shown in FIG. 13 and FIG. 14, the remaining amount and the deviation amount can be directly drawn on a workpiece so as to be able to visually teach an operator. In this manner, by visually showing the remaining amount and the deviation amount to an operator, not only the design information can be projected on a workpiece using a laser beam, but also comparative determination between design information and a machining result on a workpiece can be easily performed.

Figure 15:
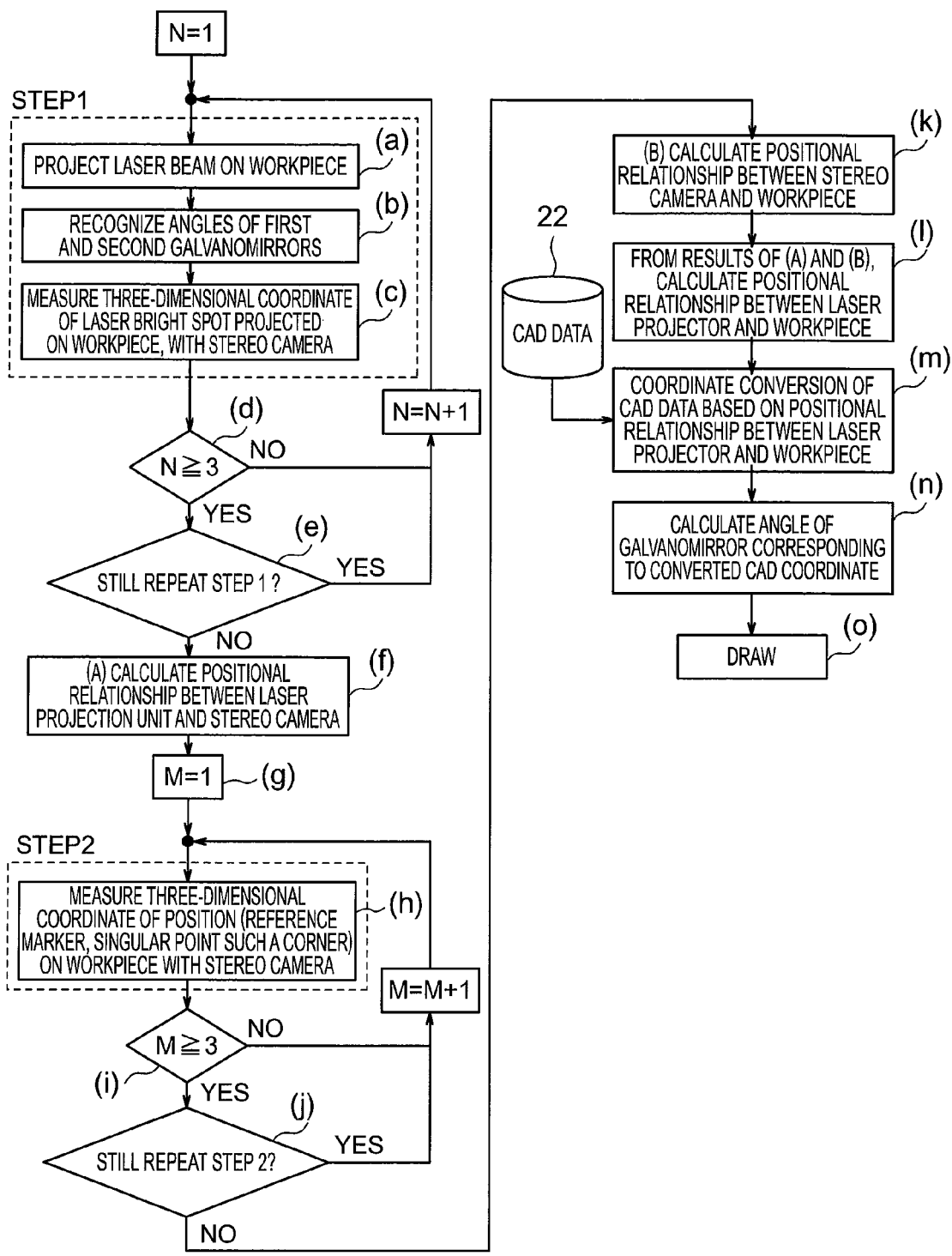
FIG. 15 is a view illustrating a procedure for recognizing a positional relationship among a stereo camera, a workpiece, and a laser projector, in the embodiment of the present invention.

Next, using FIG. 15, a method is described, for calculating a relative positional relationship between the stereo camera 8 and the laser projection unit 9.

Figure 16:
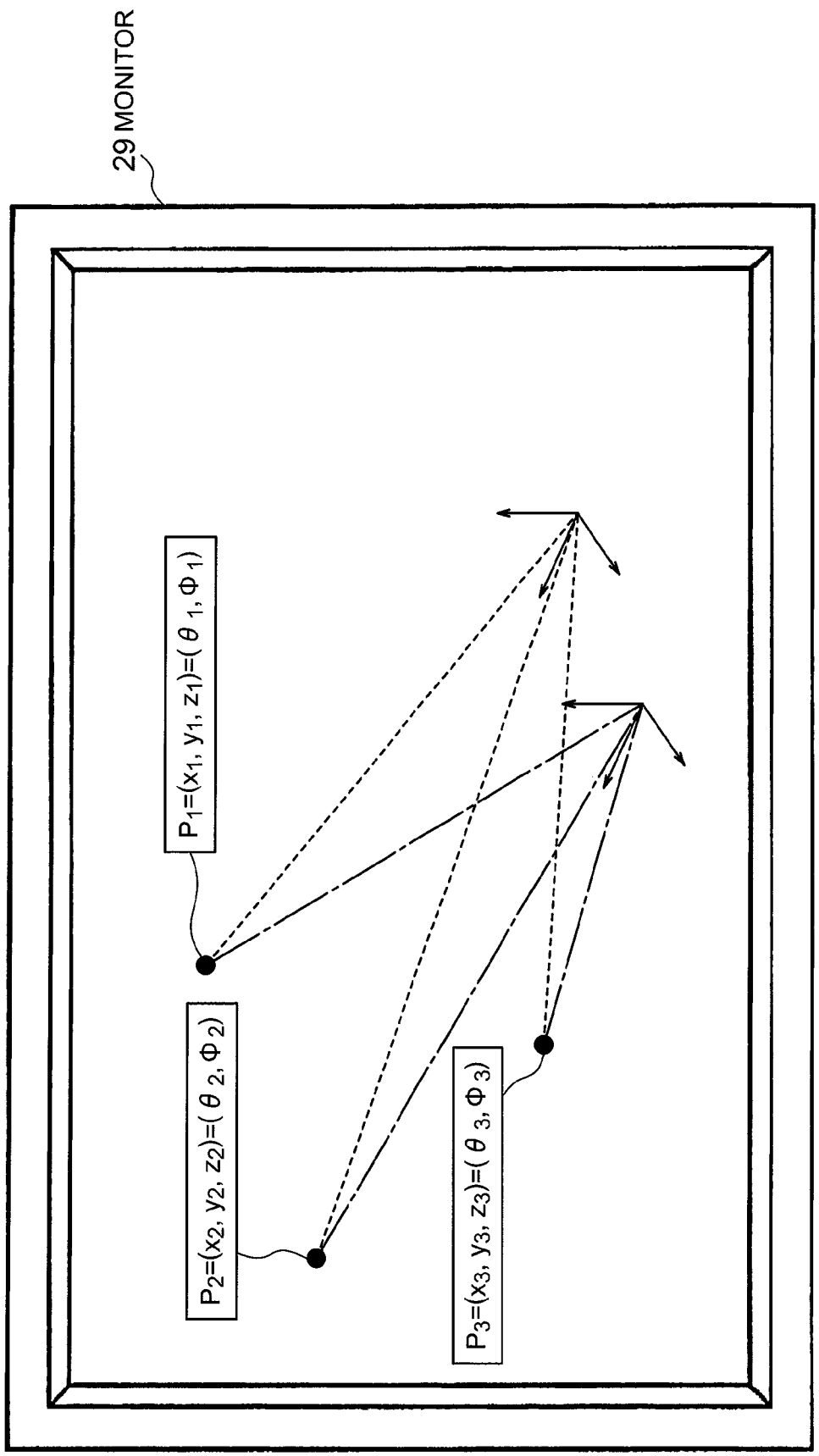
FIG. 16 is a view showing a state where a calculation result of the three-dimensional coordinate of a laser bright spot is displayed on a display, in the embodiment of the present invention.

First, a laser beam is projected to an adequate position on a workpiece (FIG. 15*a*). At this time, the angles of the first and second galvanomirrors are grasped by the mirror position indication/detection unit 15 (FIG. 15*b*). Then, the three-dimensional coordinate of a laser bright spot on the workpiece is measured with the stereo camera 8 (FIG. 15*c*). The above-described work (Step 1) is repeated three times. The above-described work may be performed four times or more as required. Then, as shown in FIG. 16, at three or more positions, a relationship between a coordinate seen from the point of origin of the stereo camera and a coordinate seen from the point of origin of the laser projection unit 9 can be calculated. Here, the point of origin of the stereo camera 8 is a lens center of the left camera 6, for example. The point of origin of the laser projection unit is a mirror center of the first galvanomirror. Here, the center of rotation of the first galvanomirror and the center of rotation of the second galvanomirror deviate from each other, but the detailed description thereof is omitted because a two-angle specified projection method taking into consideration a deviation is formulated in U.S. Pat. No. 7,306,339.

In the laser projection unit 9, only two angles, i.e., a first angle θn and a second angle φm, are specified, and therefore it is not possible to know at which distance a workpiece has been irradiated with a projected laser beam. That is, only with information of a point P1 (θ1, φ1) (r1 is uncertain), a point P2 (θ2, φ2) (r2 is uncertain), and a point P3 (θ3, φ3) (r3 is uncertain), it is not possible to determine where a work surface is. However, at the same time P1 (x1, y1, z1), P2 (x2, y2, z2), and P3 (x3, y3, z3), which are the three-dimensional coordinates of the points P1, P2, and P3, are grasped by the stereo camera 8, and therefore if these relationships are used, r1, r2, and r3 can be uniquely calculated. Thus, at the same time, a relative positional relationship between the stereo camera 8 and the laser projection unit 9 can be also calculated (FIG. 7*f*).

Specifically, first, (θn, φn, rn) is converted to a rectangular coordinate system.

P1: (θ1, φ1, r1)→(r1·cos θ1·cos φ1, r1·cos θ1·sin φ1, r1·sin φ1)

P2: (θ2, φ2, r2)→(r2·cos θ2·cos φ2, r2·cos θ2·sin φ2, r2·sin φ2)

P3: (θ3, φ3, r3)→(r3·cos θ3·cos φ3, r3·cos θ3·sin φ3, r1·sin φ3)

Here, unknown values are r1, r2, and r3.

On the other hand, the coordinates of the laser bright spots seen from the stereo camera are as follows.

P1: (x1, y1, z1)
P2: (x2, y2, z2)
P3: (x3, y3, z3)

Here, because the distances between the respective points are the same both in a coordinate system of the laser projector and in a coordinate system of the stereo camera, the following formulas are established.

|P1−P2|=|p1−p2|
|P2−P3|=|p2−p3|
|P3−P1|=|p3−p1|

As described above, because there are three formulas for three unknown values, the unknown values, r1, r2, and r3, can be uniquely calculated. Now assume that the coordinates of the laser bright spots in the stereo camera coordinate system are (x1, y1, z1), (x2, y2, z2), and (x3, y3, z3), and that the coordinates of the laser bright spots in the laser projector coordinate system are (X1, Y1, Z1), (X2, Y2, Z2), and (X3, Y3, Z3). Then, the circumcenter of (x1, y1, z1), (x2, y2, z2), and (x3, y3, z3) is calculated, and this is designated by (x0, y0, z0). Next, the circumcenter of (X1, Y1, Z1), (X2, Y2, Z2), and (X3, Y3, Z3) is calculated, and this is designated by (X0, Y0, Z0). Here, a vector heading toward the circumcenter (x0, y0, z0) from the point of origin of the stereo camera coordinate system is designated by A. A vector heading toward the circumcenter (X0, Y0, Z0) from the point of origin of the laser projector coordinate system is designated by B. Although seen from the different coordinate systems, (x0, y0, z0) and (X0, Y0, Z0) are the same points in a global coordinate system. Then, this point is set to the point of origin of the global coordinate system. Then, a vector heading toward the point of origin of the stereo camera coordinate system from the point of origin of the global coordinate system is −A, and a vector heading toward the point of origin of the laser projector coordinate system from the point of origin of the global coordinate system is −B. Accordingly, the positional relationship between the stereo camera coordinate system and the laser projector coordinate system can be easily calculated from the vector −A and the vector −B. Note that, if two or more laser spots reside on the same straight line when laser bright spots are seen from the stereo camera and the laser projector, the mutual positional relationship cannot be calculated, and therefore the laser bright spots should not reside on the same straight line when seen from whichever coordinate system.

Figure 17:
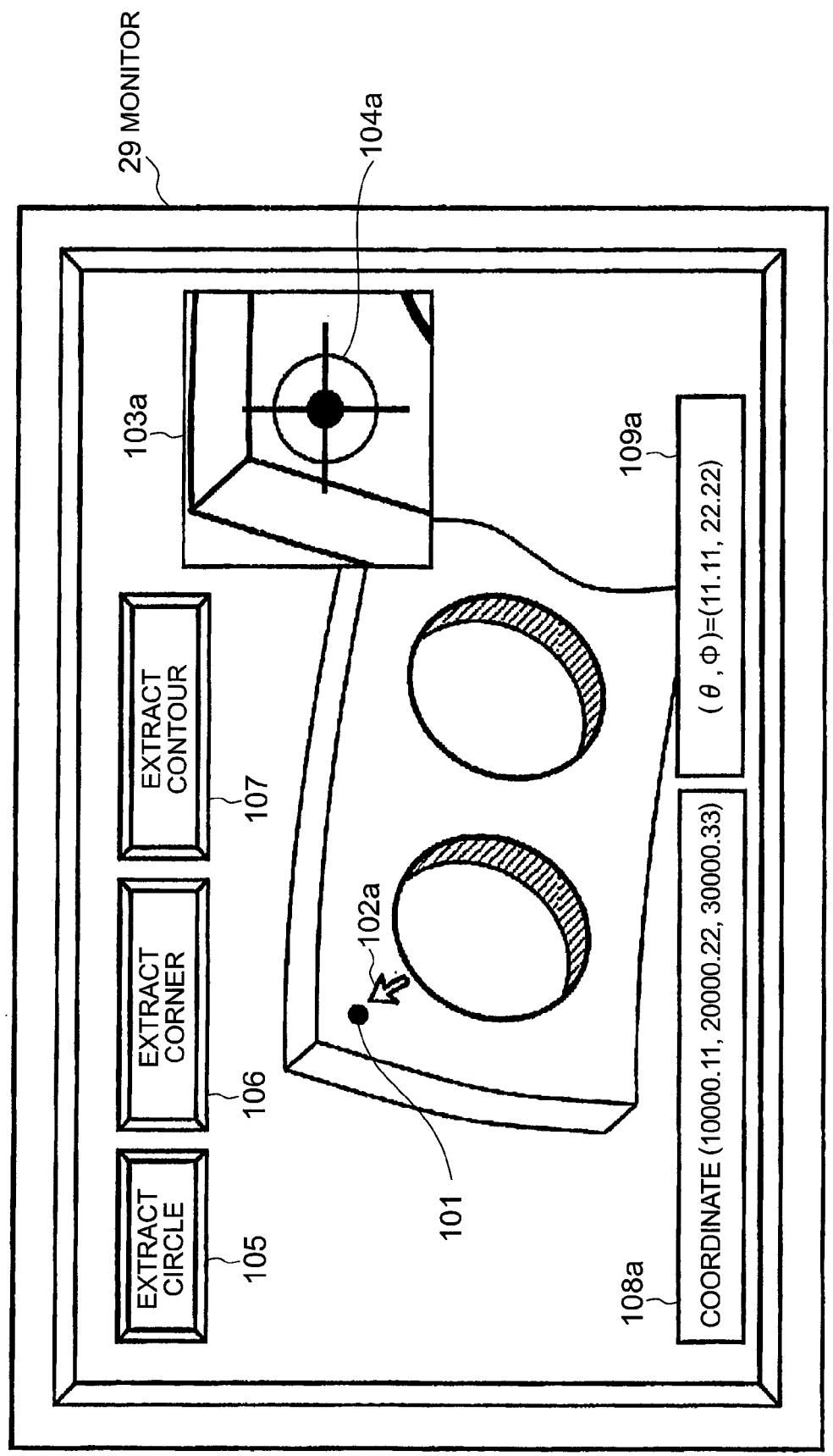
FIG. 17 is a view illustrating a procedure (which a user manipulates while watching a monitor screen) for calculating the three-dimensional coordinate of a circular reference marker or a projection laser bright spot, in the embodiment of the present invention.
Figure 18:
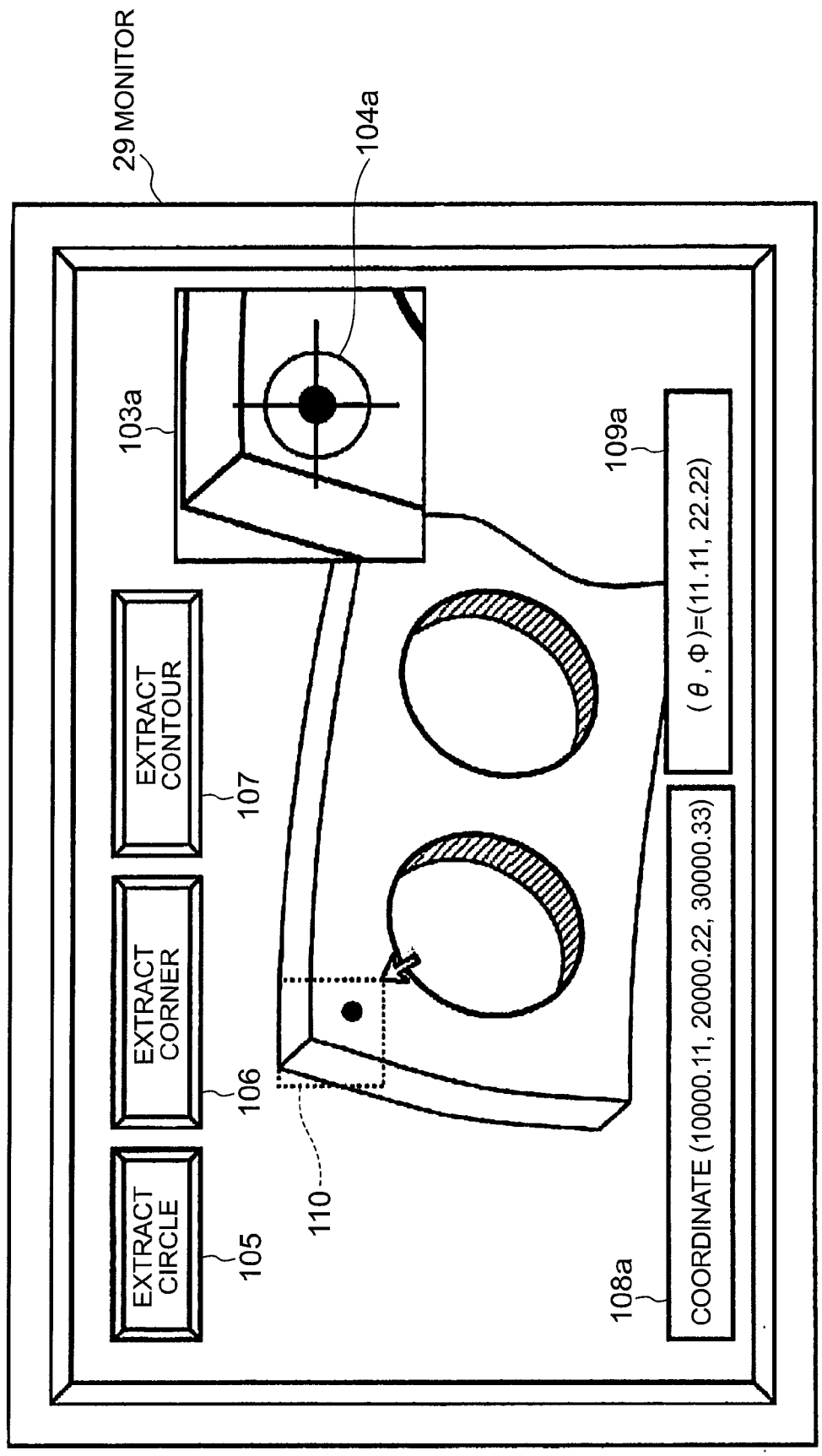
FIG. 18 is another view illustrating the procedure (which a user manipulates while watching a monitor screen) for calculating the three-dimensional coordinate of a circular reference marker or a projection laser bright spot, in the embodiment of the present invention.

Next, a specific procedure for calculating the three-dimensional coordinate of a laser bright spot position on the workpiece with the stereo camera 8 is described using FIG. 17 and FIG. 18. First, on the monitor 29, for example an image of the left camera 6 is displayed. Once a vicinity of a reference marker (laser origin) 101 of the workpiece 26 is specified with a mouse pointer 102a, an enlarged window 103a is displayed. If a circle extraction button 105 is depressed in advance, the image processing unit 18 will extract a laser bright spot (in a circular form) in an enlarged and displayed area (analysis area) and calculate the center of gravity of the circle. In order to confirm that a desired center of gravity has been calculated, the center of gravity position of the circle may be displayed, for example, with a circle, a cross line 104a, and the like. In this system, because the configuration of a stereo camera is employed, the coordinate calculation unit 19 calculates the three-dimensional coordinate of the position of a laser bright spot using a stereo matching approach. For the calculated three-dimensional coordinate, a calculated coordinate value 108a may be displayed. In addition, first and second angle values 109a may be displayed.

In FIG. 17, the analysis area is narrowed down by clicking a vicinity of the reference marker 10a with the mouse, but as shown in FIG. 18, the analysis area may be narrowed down by drawing a square 110 with the mouse.

Figure 19:
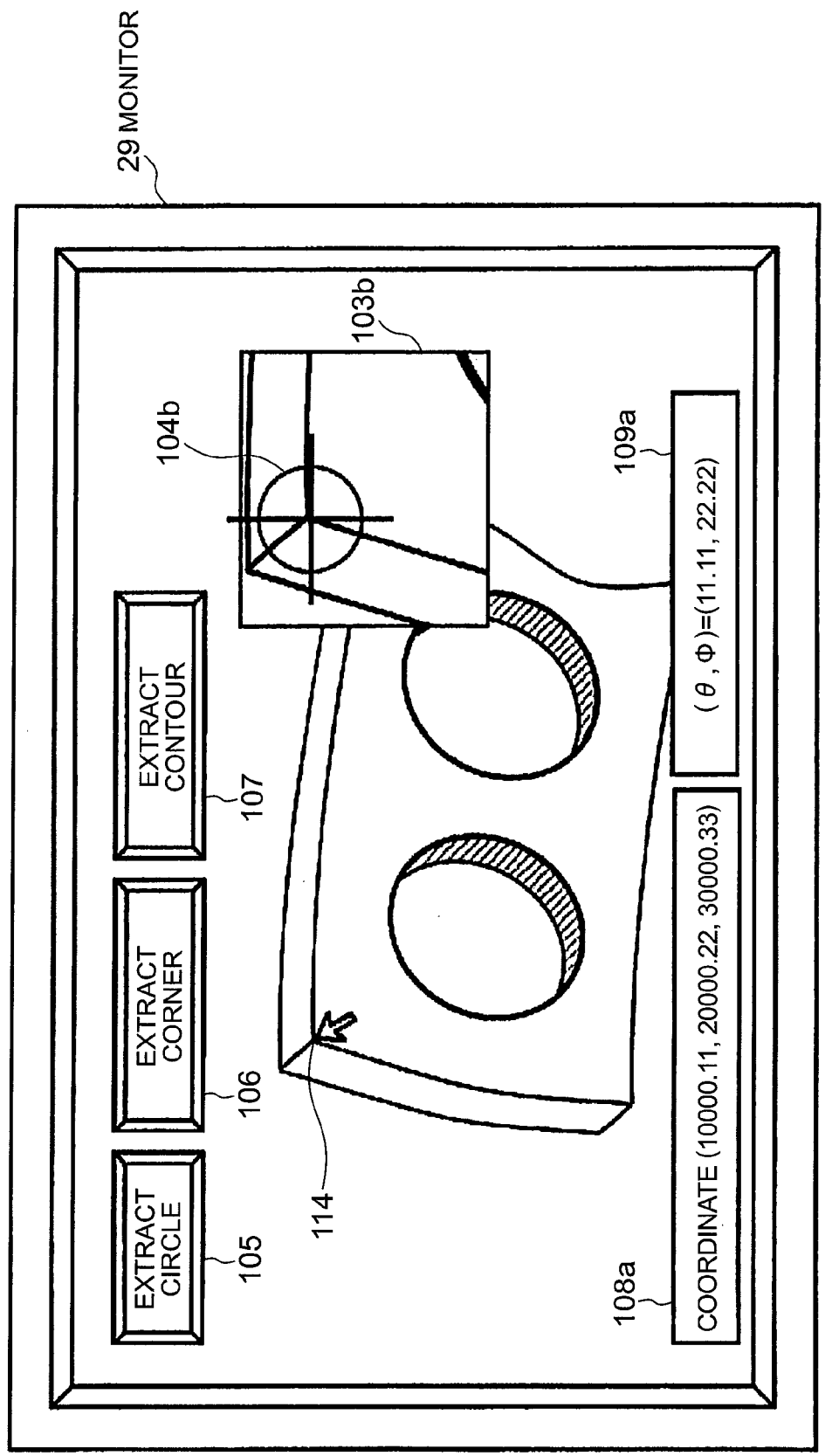
FIG. 19 is a view illustrating a procedure (which a user manipulates while watching a monitor screen) for calculating the three-dimensional coordinate of a reference position (a feature shape) of a workpiece, in the embodiment of the present invention.

Next, a specific procedure for calculating, with the stereo camera 8, a position serving as a reference on the workpiece, for example such as the three-dimensional coordinate of a feature point, such as a reference marker, and a corner, is described using again FIG. 17 and FIG. 18, and furthermore FIG. 19. First, on the monitor 29, an image of the left camera 6 is displayed, for example. This time, the circle 101 in FIG. 17 and FIG. 18 is regarded as a reference marker. Once a vicinity of the reference marker 101 is indicated with the mouse pointer 102a, the enlarged window 103a is displayed. If a circle extraction button 105 is depressed in advance, the image processing unit 18 will extract the reference marker 101 (in a circular form) in an enlarged and displayed area (analysis area) and calculate the center of gravity of the circle. In order to confirm that a desired center of gravity has been calculated, the center of gravity position of the circle may be displayed, for example, by a circle, a cross line 104a, and the like. In this system, because the configuration of a stereo camera is employed, the coordinate calculation unit 19 calculates the three-dimensional coordinate of the reference marker using a stereo matching approach. For the calculated three-dimensional coordinate, the calculated coordinate value 108a may be displayed. In addition, the first and second angle values 109a may be displayed.

As shown in FIG. 19, even without the reference marker 101, if a workpiece itself has a place 114, for example such as a corner 114 whose coordinate is known, there is a method, for example, comprising the steps of: depressing a corner extraction button 106 in advance; selecting a vicinity of the corner with a mouse and thereby automatically recognizing the corner; and calculating the three-dimensional coordinate of the corner.

Figure 20:
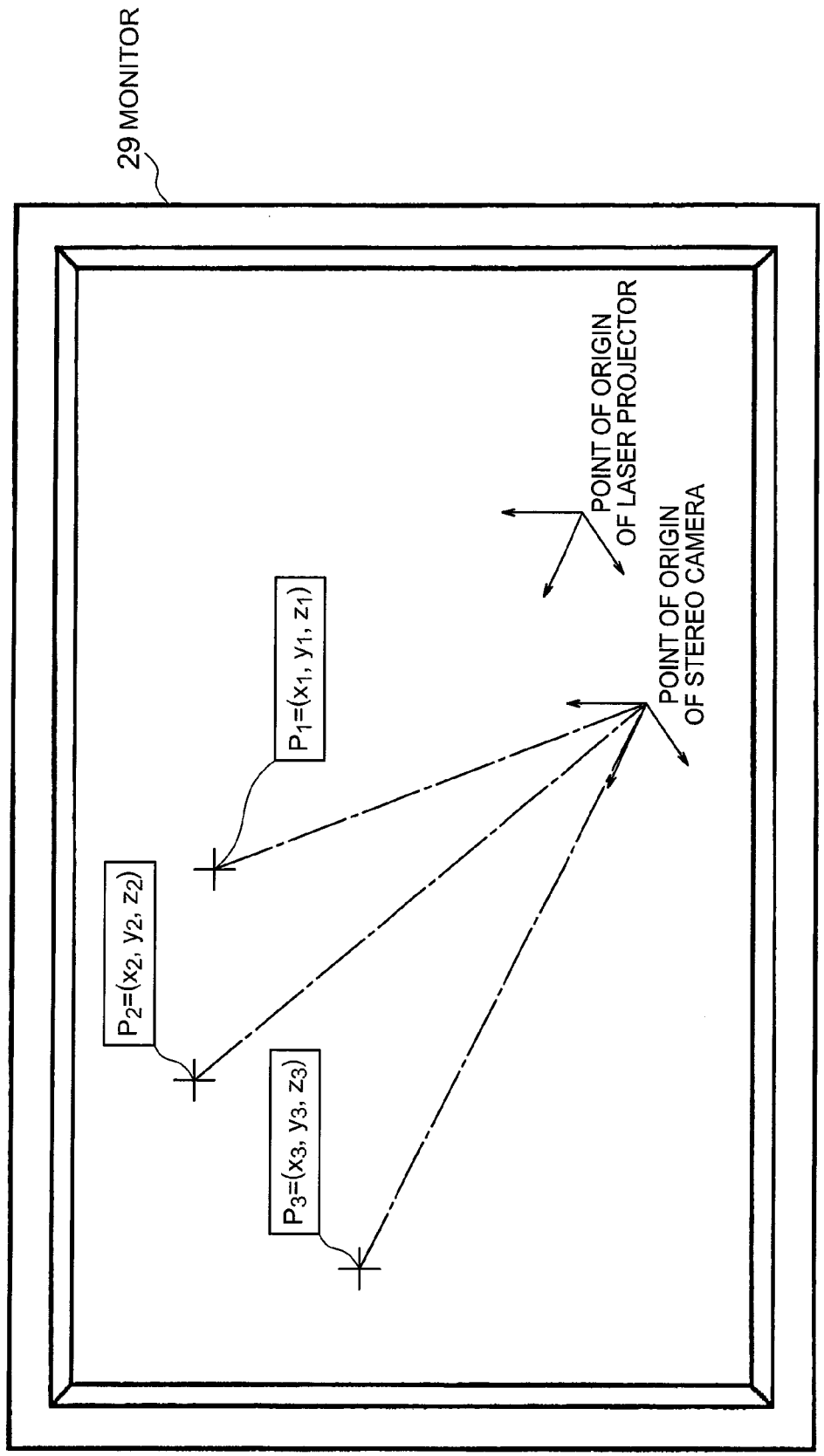
FIG. 20 is a view showing a state where a result of calculating the reference position of a workpiece with a stereo camera is displayed on a display, in the embodiment of the present invention.
Figure 21:
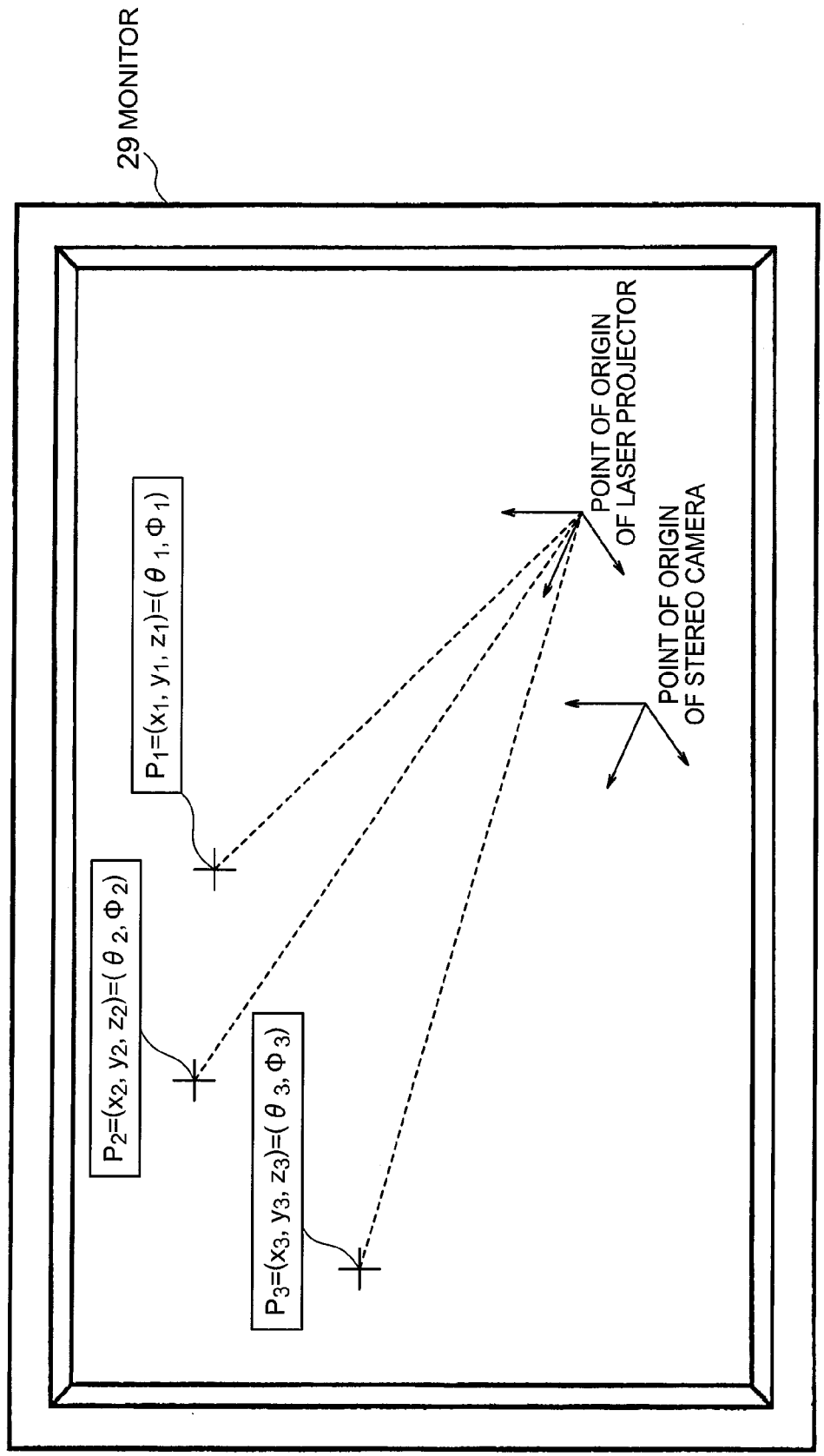
FIG. 21 is a view showing a state where a result of converting a result of calculating the reference position of a workpiece with the stereo camera to a reference position seen from a laser projection unit is displayed on a display, in the embodiment of the present invention.

With the above processing, as shown in FIG. 20 a positional relationship between the workpiece 26 and the stereo camera 8 can be calculated. Subsequently, if the recognized positional relationship between the stereo camera 8 and the laser projection unit 9 is used, a positional relationship between the workpiece 26 and the laser projection unit 9 is also uniquely calculated.

By performing coordinate conversion of the CAD data 22 by the CAD data conversion unit 21 in accordance with this positional relationship between the workpiece 26 and the laser projection unit 9, the data for laser projection is generated. Based on this data for laser projection, the stage position indication/detection unit 14 and the mirror position indication/detection unit 15 drive the linearly-moving stage 2, the first galvanomirror, and the second galvanomirror via the linearly-moving stage control unit 11, the first angle control unit 12, and the second angle control unit 13 to draw.

The method and apparatus for laser projection of the present invention are laser projection techniques effectively utilized in order to obviate wrong cutting, confirm processing states, and check omission of machining in machine works.

Hereinafter, a machining method according to an embodiment of the present invention is described using FIG. 22 to FIG. 45.

Figure 22:
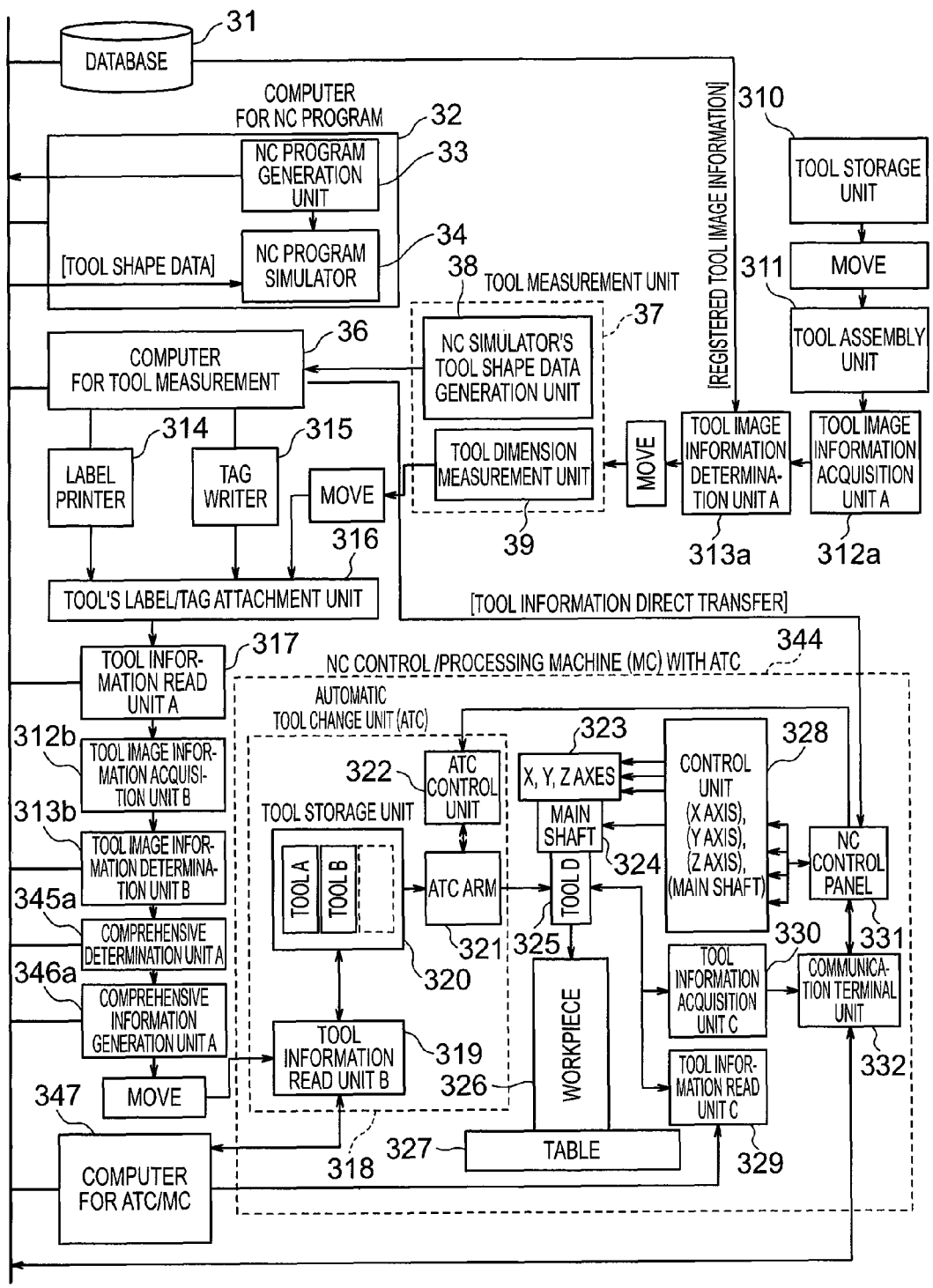
FIG. 22 is a block diagram showing the entire configuration of a working machine for performing a machining method according to an embodiment of the present invention.

First, using FIG. 22, the entire configuration of a working machine having a wrong-cutting preventing function based on tool recognition, for performing the machining method according to this embodiment is described.

FIG. 22 is a block diagram showing the entire configuration of the working machine for performing the machining method according to an embodiment of the present invention.

In the working machine of this embodiment, registered tool image information is already stored in a database 31. A computer for NC program 32 includes an NC program generation unit 33 and an NC program simulator 34. The details of each of these components will be described later using FIG. 23.

In a tool assembly unit 311, a tool taken out from a tool storage unit 310 is assembled. A tool image information acquisition unit 312a acquires image information of a tool assembled by the tool assembly unit 311. Then, a tool image information determination unit 313a compares the image information acquired by the tool image information acquisition unit 312a with the registered tool image information taken out from the database 31 to determine the tool. The details of the operation of the tool image information acquisition unit 312a and the tool image information determination unit 313a are described later using FIG. 24.

A tool measurement unit 37 includes an NC simulator's tool shape data generation unit 8 and a tool-dimension measurement unit 39. The details of each of these components will be described later using FIG. 27.

A computer for tool measurement unit 36 prepares a label by a label printer 314, and also prepares a tag by a tag writer 315. A tool's label/tag attaching unit 316 attaches the prepared label and tag to a tool.

A tool information read unit A 317 reads information from the label/tag attached to the tool. The tool image information acquisition unit A 312a acquires the image information of the tool. A tool image information determination unit B 313b determines the tool from the image information acquired by the tool image information acquisition unit A 312a. A comprehensive determination unit A 345a comprehensively determines from the information read by the tool information read unit A 317 and the information acquired by the tool image information determination unit B 313b. A comprehensive information generation unit A 346a generates comprehensive information obtained by putting together the information recorded on the label/tag and the image information, and sends the same to the database.

An NC control working machine (MC) 344 with an ATC includes a machine's X-axis/Y-axis/Z-axis control unit 328, a tool information read unit C 329, a tool image information acquisition unit C 330, an NC control panel 331, a communication terminal unit 332, and an automatic tool change unit (ATC) 318. The automatic tool change unit (ATC) 318 includes a tool information read unit B 319, a tool storage unit 320, an ATC arm 321, and an ATC control unit 322. The NC control working machine (MC) 344 is controlled by a computer for ATC/MC 347.

Figure 23:
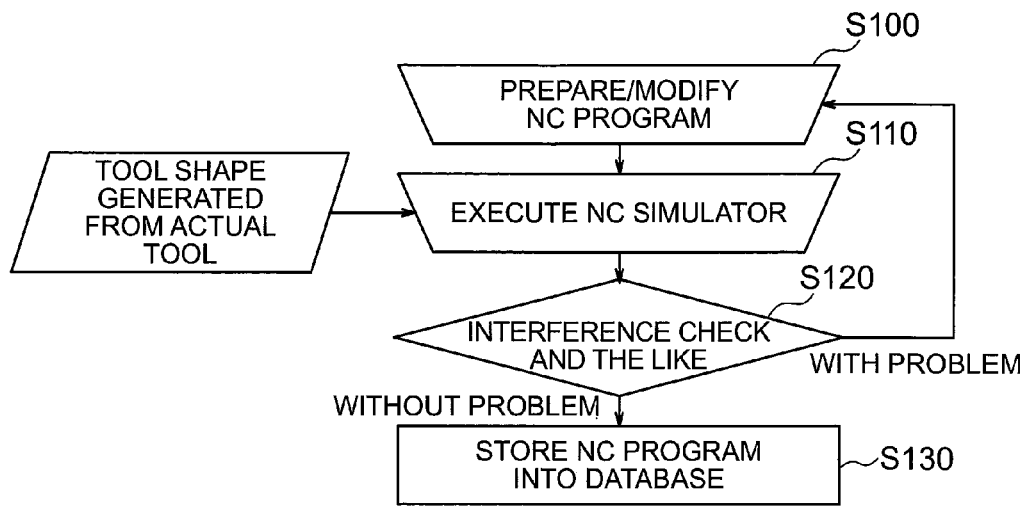
FIG. 23 is a flowchart showing an operation of a computer for NC program used for the working machine that performs the machining method according to an embodiment of the present invention.

Next, using FIG. 23, the operation of the computer for NC program 32 used in the working machine that performs the machining method according to this embodiment is described.

FIG. 23 is a flowchart showing the operation of the computer for NC program used in the working machine that performs the machining method according to an embodiment of the present invention.

In machining a workpiece, first in Step S100, by an NC programmer, an NC program is generated in the NC program generation unit 33 of the computer for NC program 32. Next, in Step S110, simulation of the NC program to be executed by the working machine 344 is performed by the NC program simulator 34 of the computer for NC program 32, and in Step S120, an error, collision hazard prevention, and the like are checked. An NC program confirmed as not having a problem is stored into the database 31 via a network in Step S130.

Figure 24:
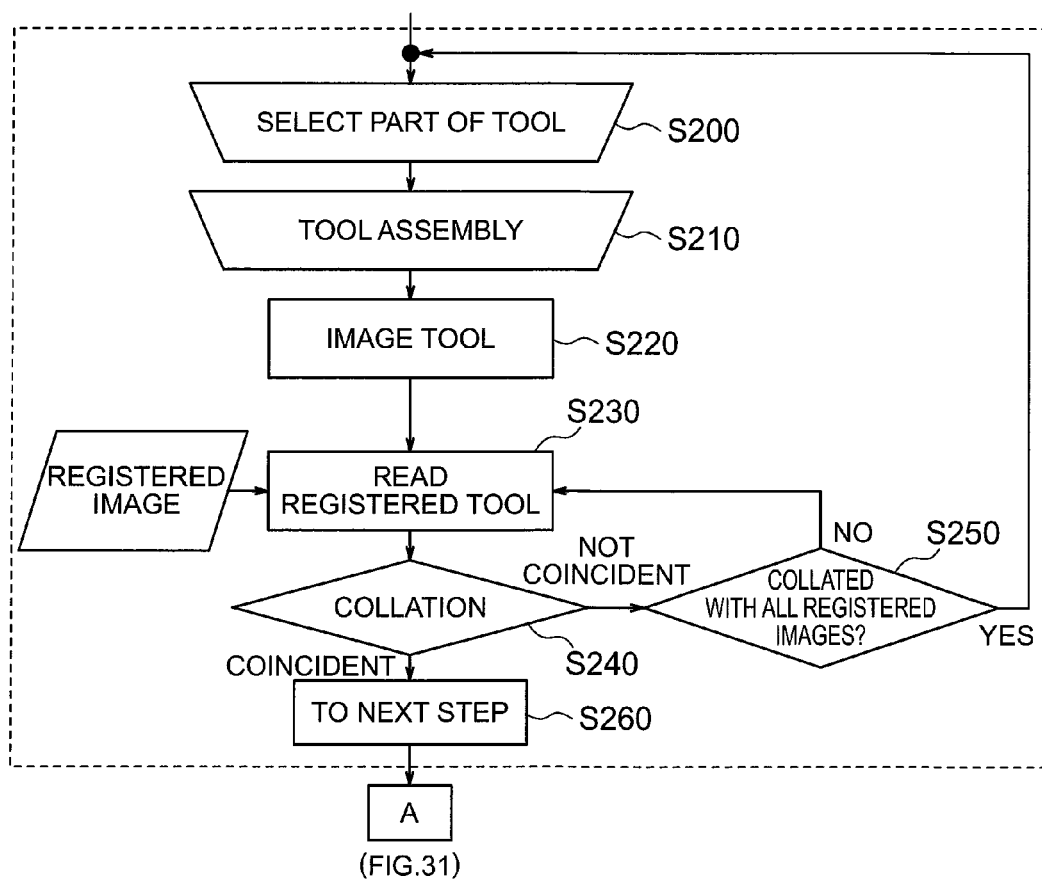
FIG. 24 is a flowchart showing an operation of a tool assembly unit, a tool image information acquisition unit, and a tool image information determination unit used for the working machine that performs the machining method according to an embodiment of the present invention.

Next, using FIG. 24, the operation of the tool assembly unit 311, the tool image information acquisition unit 312a, and the tool image information determination unit 313a used for the working machine that performs the machining method according to this embodiment is described.

FIG. 24 is a flowchart showing the operation of the tool assembly unit, the tool image information acquisition unit, and the tool image information determination unit used for the working machine that performs the machining method according to an embodiment of the present invention.

First, in Step S200, a desired tool is selected from the tool storage unit 310 by a working machine's operator. A selected tool is moved to the tool assembly unit 311, and is then assembled by the tool assembly unit 311 in Step S210. Next, in Step S220, an image of the assembled tool is captured by the tool image information acquisition unit 312a.

Here, using FIG. 25 to FIG. 30, a method for capturing a tool image for collation in the working machine that performs the machining method according to this embodiment is described.

Figure 25:
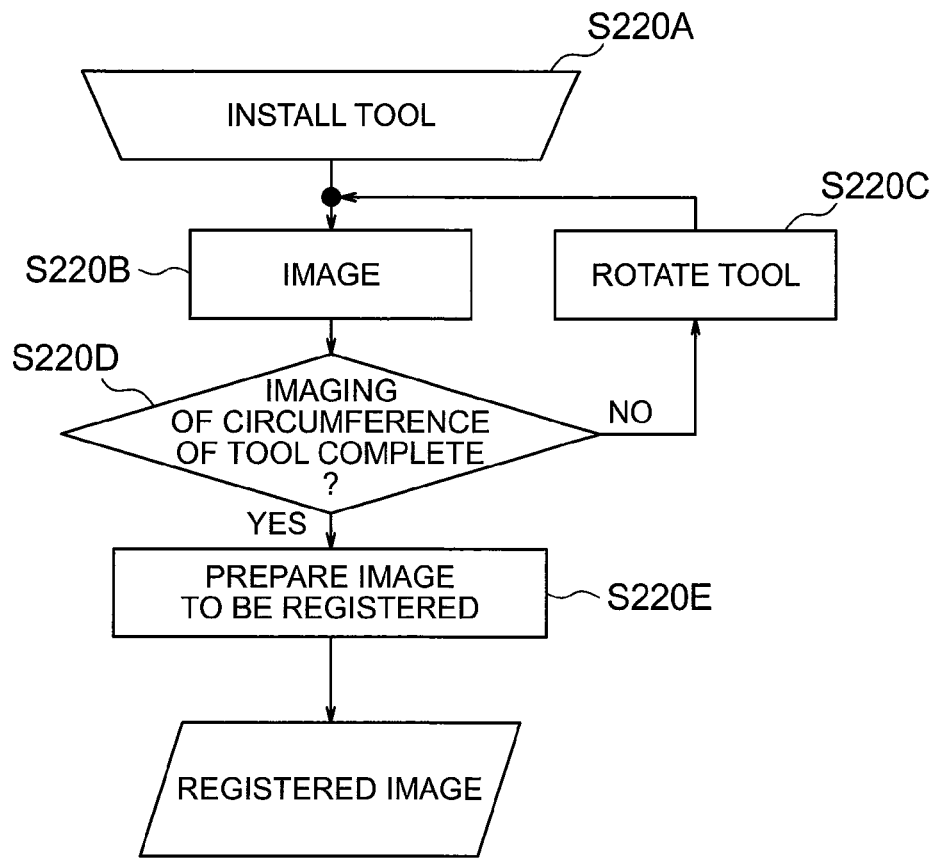
FIG. 25 is a flowchart showing the content of a method for capturing a tool image for collation in the working machine that performs the machining method according to an embodiment of the present invention.
Figure 26:
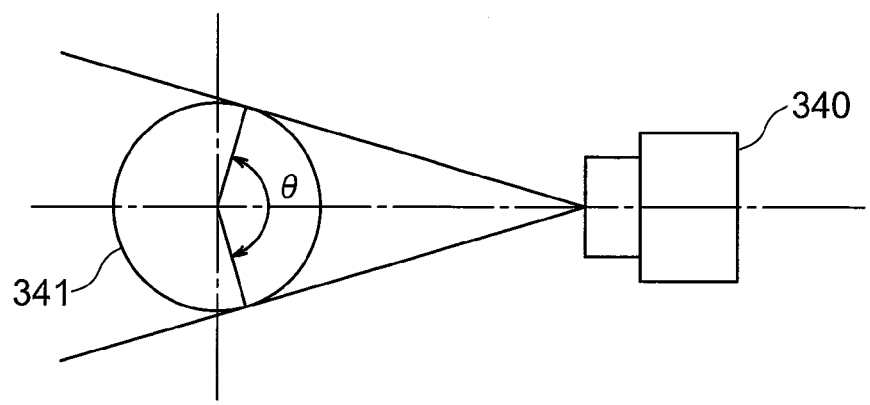
FIG. 26 is an explanatory view of the method for capturing a tool image for collation in the working machine that performs the machining method according to an embodiment of the present invention.

FIG. 25 is a flowchart showing the content of the method for capturing a tool image for collation in the working machine that performs the machining method according to an embodiment of the present invention. FIG. 26 is an explanatory view of the method for capturing a tool image for collation in the working machine that performs the machining method according to an embodiment of the present invention. FIG. 27 to FIG. 30 are front views of various types of tools used for the working machine that performs the machining method according to an embodiment of the present invention.

First, in Step S220A in FIG. 25, a tool is installed on a turntable. Next, in Step S220A, the tool is imaged.

Figure 27:
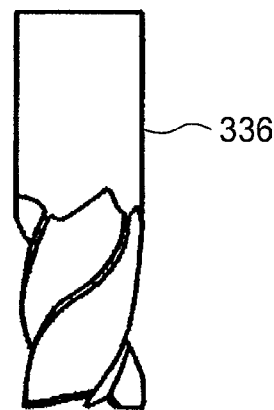
FIG. 27 is a front view of a tool used for the working machine that performs the machining method according to an embodiment of the present invention.
Figure 28:
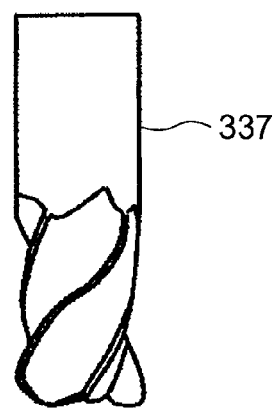
FIG. 28 is a front view of a tool used for the working machine that performs the machining method according to an embodiment of the present invention.
Figure 29:
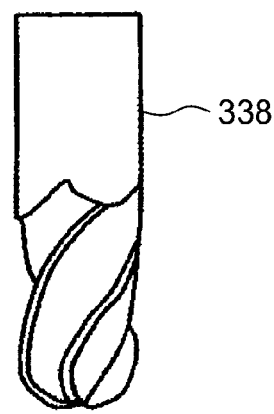
FIG. 29 is a front view of a tool used for the working machine that performs the machining method according to an embodiment of the present invention.
Figure 30:
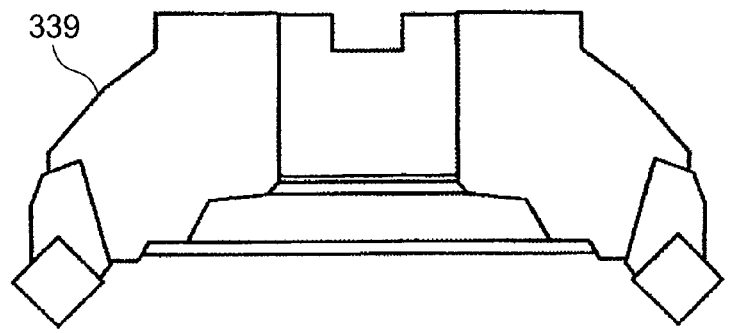
FIG. 30 is a front view of a tool used for the working machine that performs the machining method according to an embodiment of the present invention.

Here, FIG. 27 shows an example of the appearance of an end mill FIG. 28 shows an example of the appearance of a radius end mill FIG. 29 shows an example of the appearance of a ball end mill Furthermore, FIG. 30 shows an example of the appearance of a face mill. Even if these tools are of the same types, the number of cutting edges may differ.

Here, in capturing an image, as shown in FIG. 26 if a tool is imaged only from a certain direction, portions not included in an image will remain. For example, in the case of a cylindrical drill 341, only portion in the range of angle θ from the center can be imaged. Accordingly, a difference in the number of cutting edges or the like cannot be recognized.

Then, in Step 220D of FIG. 25, the tool is rotated and an image thereof is captured. Then, this is repeated via Step S220C to capture an entire circumference image of the tool, and in Step S220E the captured image is registered with the database 31.

Note that, this embodiment shows an example, in which the entire circumference image of a tool is captured in capturing an image for registration, and when an assembled tool is imaged, an image is captured from one direction and one image captured after assembly is collated with a plurality of registered images.

Next, returning to Step 230 of FIG. 24, a registered image, which is registered in advance with the database 31, is read. Then, in Step S240, in the tool image information determination unit 313a, the captured tool image is collated with the registered image. If the both coincide, the collation is complete in Step S260, and if not, collation with the next registered image is performed in Step S250.

When it has not been determined that the both coincide even if collation with all the registered images is complete, a wrong tool has been assembled and therefore the tool is reconfirmed and re-assembled.

Here, the method for collating images, i.e., comparing the coincidences between images, in Step S240 in FIG. 24 is described. As the method for comparing coincidences between images, a template matching is used for example. As an evaluation value (similarity or dissimilarity) indicative of how much a registered image (template) and a captured image are alike, the following values are used. In Formula (1) to Formula (8) below, a brightness value of a template is designated by T(i, j), and a brightness value of a captured image is designated by I(i, j). For the coordinate (i, j), when the width of the template corresponds to m pixels and the height corresponds to n pixels, the upper left is set to (0, 0) and the lower right is set to (m−1, n−1).

For SSD (Sum of Squared Difference) shown in Formula (1), a template is raster-scanned, and a square sum of differences between the brightness values of a pixel at the same position is used. The smaller the value of SSD, the more alike the positions become.

$$R_{SSD} = \sum_{j=0}^{N-1} \sum_{i=0}^{M-1} (I(i, j) - T(i, j))^2 \qquad \text{Formula (1)}$$

For SAD (Sum of Absolute Difference) shown in Formula (2), a template is raster-scanned, and a sum of the absolute values of differences between the brightness values of a pixel at the same position is used. The smaller the value of SAD, the more alike the positions become.

$$R_{SAD} = \sum_{j=0}^{N-1} \sum_{i=0}^{M-1} |I(i, j) - T(i, j)| \quad \text{Formula (2)}$$

For normalized cross-correlation (NCC) shown in Formula (3), as similarity between a template image and a captured image, a normalized cross-correlation below is used. The closer to 1 the similarity, the more alike the positions become.

$$R_{NCC} = \frac{\sum_{j=0}^{N-1} \sum_{i=0}^{M-1} I(i, j)T(i, j)}{\sqrt{\sum_{j=0}^{N-1} \sum_{i=0}^{M-1} I(i, j)^2 \times \sum_{j=0}^{N-1} \sum_{i=0}^{M-1} T(i, j)^2}} \quad \text{Formula (3)}$$

This calculation formula is the same as a formula obtained by transforming a formula of an inner product to a formula of Cos θ=. If the formula above is transformed to Formula (4) below, an inner product of a vector of I of M×N dimensions and a vector of T of M×N dimensions is obtained.

$$R_{NCC} = \frac{I(0,0)T(0,0) + I(1,0)T(1,0) + \ldots + I(M-1, N-1)T(M-1, N-1)}{\sqrt{I(0,0)^2 + I(1,0)^2 + \ldots + I(M-1, N-1)^2} \sqrt{T(0,0)^2 + T(1,0)^2 + \ldots + T(M-1, N-1)^2}} \quad \text{Formula (4)}$$

Here, because the value of RNCC is equivalent to Cos θ, the value of RNCC is a value in a range from −1 to +1. When RNCC=1, the both are completely the same images, and when RNCC=1, the both are negative-positive inverted images.

In a cross-correlation coefficient of the above-described NCC, if the brightness of a template or a captured image fluctuates, the value of NCC will also fluctuate. In contrast, in Zero-mean Normalized Cross-Correlation (ZNCC) shown in Formula (5), by subtracting an average value of the brightness values of a template from each brightness value of the template and subtracting an average value of the brightness values of a captured image from each brightness value of the captured image, the similarity can be stably calculated even if there is a fluctuation in brightness.

$$R_{ZNCC} = \frac{\sum_{j=0}^{N-1} \sum_{i=0}^{M-1} ((I(i, j) - \bar{I})(T(i, j) - \bar{T}))}{\sqrt{\sum_{j=0}^{N-1} \sum_{i=0}^{M-1} (I(i, j) - \bar{I})^2 \times \sum_{j=0}^{N-1} \sum_{i=0}^{M-1} (T(i, j) - \bar{T})^2}} \quad \text{Formula (5)}$$

Here, in this Formula (5), an average value of the brightness values inside the area of a template is calculated and further the average value is subtracted from a brightness value, and therefore programming as is results in an inefficient program. Then, the formula of RZNCC is transformed. The average brightness value of a template and the average of the brightness values of an image in the same area as the template can be calculated Formula (6) and Formula (7) below.

$$\bar{T} = \frac{\sum_{j=0}^{N-1} \sum_{i=0}^{M-1} T(i, j)}{MN} \quad \text{Formula (6)}$$

$$\bar{I} = \frac{\sum_{j=0}^{N-1} \sum_{i=0}^{M-1} I(i, j)}{MN} \quad \text{Formula (7)}$$

Thus, if these values are substituted into Formula (5) of RZNCC and arranged, Formula (8) below is obtained.

$$R_{ZNCC} = \frac{MN \sum_{j=0}^{N-1} \sum_{i=0}^{M-1} I(i, j)T(i, j) - \sum_{j=0}^{N-1} \sum_{i=0}^{M-1} I(i, j) \times \sum_{j=0}^{N-1} \sum_{i=0}^{M-1} T(i, j)}{\sqrt{\left(MN \sum_{j=0}^{N-1} \sum_{i=0}^{M-1} I(i, j)^2 - \left(\sum_{j=0}^{N-1} \sum_{i=0}^{M-1} I(i, j)\right)^2\right)} \sqrt{\left(MN \sum_{j=0}^{N-1} \sum_{i=0}^{M-1} T(i, j)^2 - \left(\sum_{j=0}^{N-1} \sum_{i=0}^{M-1} T(i, j)\right)^2\right)}} \quad \text{Formula (8)}$$

If this formula is used, calculation efficiency improves because the calculation is done in programmatically one pass.

Note that, when there are rotation and/or scale fluctuation between a template image and a captured image, matching may be performed after performing affine transformation (scaling/rotational transform, sharing) to either of the images.

In this manner, in this embodiment, not by confirming the number of a tool assembly work instruction document or the like, but by using the image of an actually assembled tool, whether or not a tool is a desired tool is determined. Therefore, a mechanism can be constructed, for catching, at this point, a selection error and/or assembly error of a part of a tool caused by a human error and for reliably assembling a desired tool.

Next, using FIG. 31 to FIG. 35, the operation of the tool measurement unit 7 in the working machine that performs the machining method according to this embodiment is described.

Figure 31:
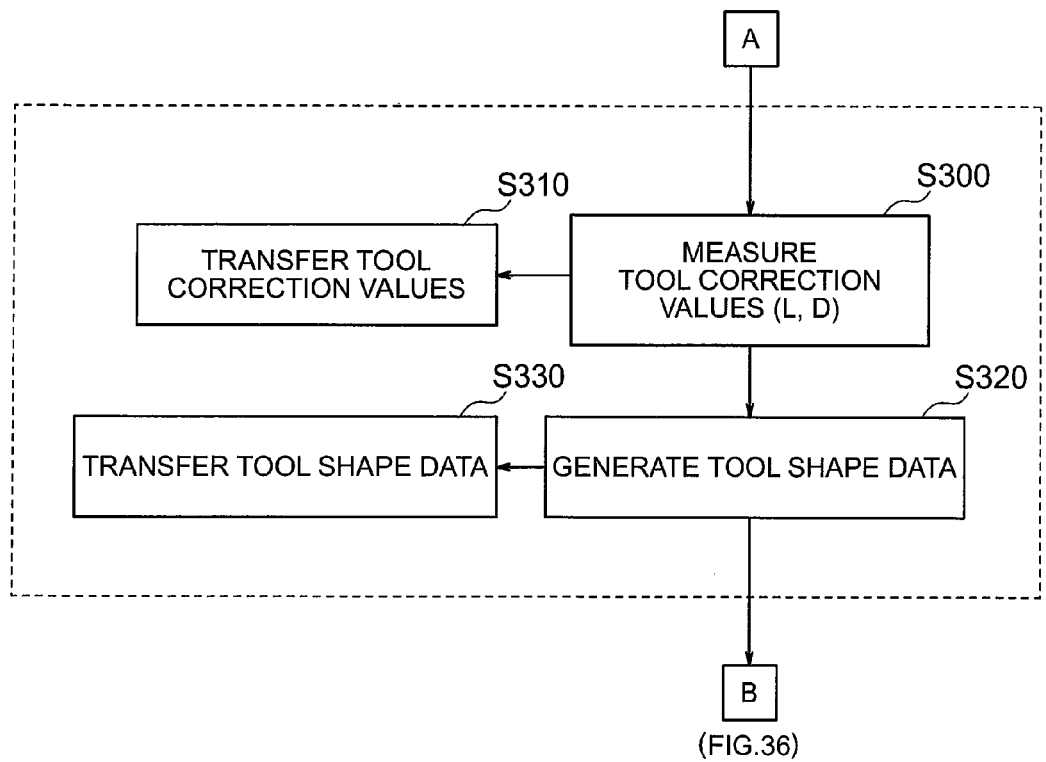
FIG. 31 is a flowchart showing an operation of a tool measurement unit in the working machine that performs the machining method according to an embodiment of the present invention.

FIG. 31 is a flowchart showing the operation of the tool measurement unit in the working machine that performs the machining method according to an embodiment of the present invention. FIG. 32 to FIG. 35 are explanatory views of shape data of various types of tools used for the working machine that performs the machining method according to an embodiment of the present invention.

A tool, which is assured to be a desired tool by the tool information determination unit A313a of FIG. 22, is next moved to the tool measurement unit 37.

The tool-dimension measurement unit 39 of the tool measurement unit 37 measures the dimensions of a tool, e.g., diameter (D) and length (L), in Step S300. For example, if a measurement value of the length L of an end mill, which is an example of a tool, is 10.05 mm and a design value L0 of this tool is 10.0 mm, then an error ΔL (=L−L0) is +0.05 mm Because this error results in a machining error when performing NC machining using this tool, information regarding the diameter and/or length is sent to the database 1 via the computer for tool measurement unit 36, with the value of this error ΔL as a tool correction value. Moreover, in Step S310, the NC simulator's tool shape data generation unit 38 sends information of NC simulator's tool shape data to the database 31 via the computer for tool measurement unit 36. The computer for NC program 32 simulates the NC program using this data. Moreover, this information is transferred also to the NC control panel 31.

Figure 32:
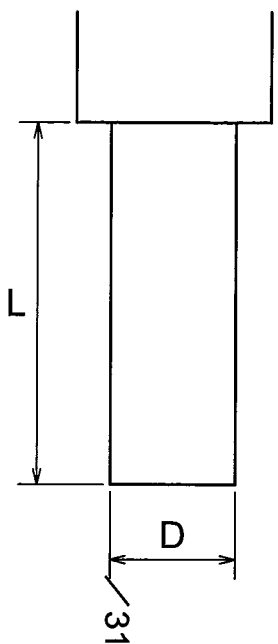
FIG. 32 is an explanatory view of shape data of a tool used for the working machine that performs the machining method according to an embodiment of the present invention.
Figure 33:
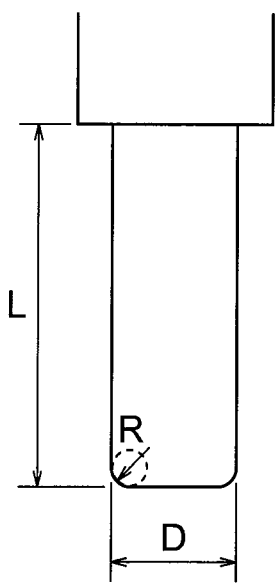
FIG. 33 is an explanatory view of shape data of a tool used for the working machine that performs the machining method according to an embodiment of the present invention.
Figure 34:
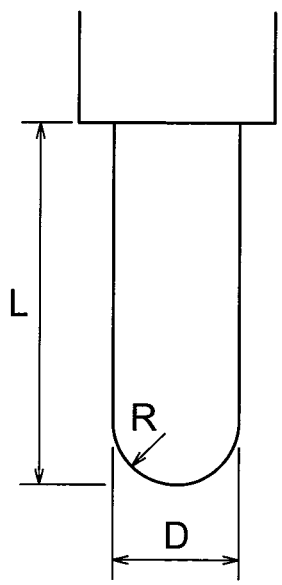
FIG. 34 is an explanatory view of shape data of a tool used for the working machine that performs the machining method according to an embodiment of the present invention.
Figure 35:
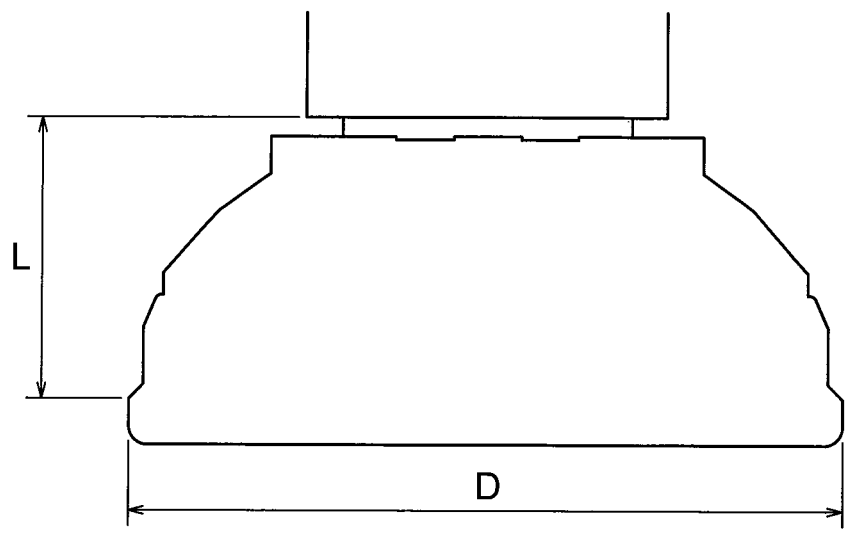
FIG. 35 is an explanatory view of shape data of a tool used for the working machine that performs the machining method according to an embodiment of the present invention.

Here, FIG. 32 shows an example of the shape data of an end mill Here, the diameter (D) and length (L) of the end mill are measured. FIG. 33 shows an example of a radius end mill Here, the diameter (D), length (L), and R of the leading end are measured. FIG. 34 shows an example of a ball end mill Here, the diameter (D), length (L), and R of the leading end are measured. Furthermore, FIG. 35 shows an example of a face mill, where the diameter (D) and length (L) are measured.

In Step S320, in the NC simulator's tool shape data generation unit 38, the shape of a tool used in the NC program simulator 34 is measured. Thus, the NC program simulator 34 can simulate based on the shape of a tool that is actually used for machining The shape of the measured tool is sent to the database 31 via the computer for tool measurement unit 36 in Step S330.

Next, using FIG. 36 to FIG. 43, an operation to attach tool information to a tool and confirm the tool in the working machine that performs the machining method according to this embodiment is described.

Figure 36:
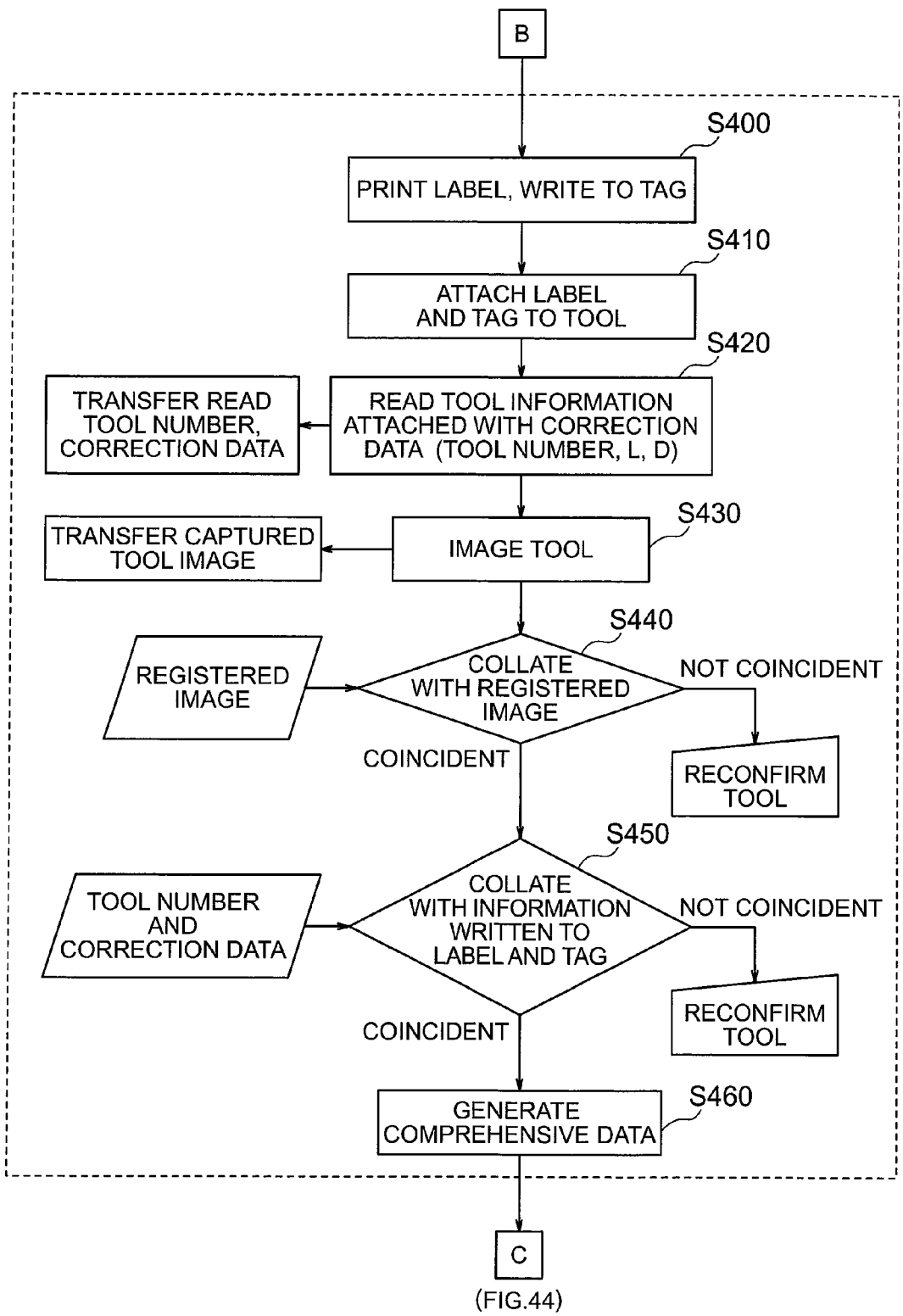
FIG. 36 is a flowchart showing an operation to attach tool information to a tool and confirm the tool in the working machine that performs the machining method according to an embodiment of the present invention.
Figure 37:
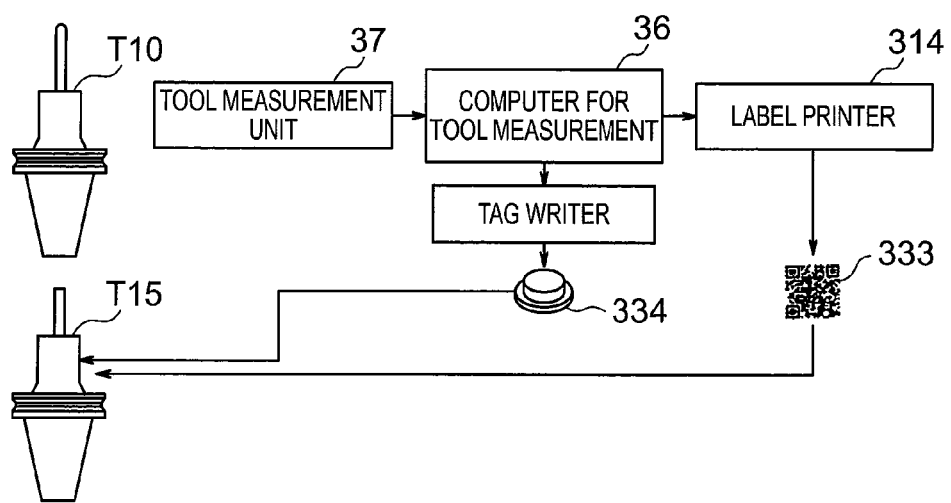
FIG. 37 is an explanatory view of how to attach tool information to a tool in the working machine that performs the machining method according to an embodiment of the present invention.
Figure 38:
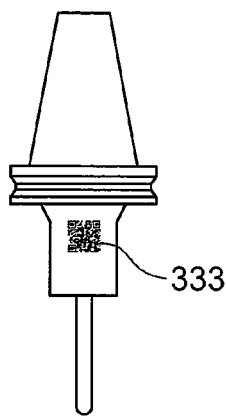
FIG. 38 is an explanatory view of how to attach tool information to a tool in the working machine that performs the machining method according to an embodiment of the present invention.
Figure 39:
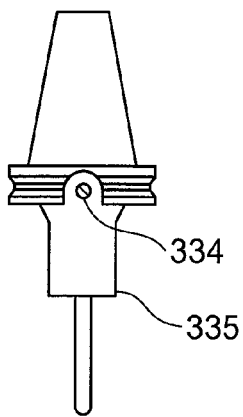
FIG. 39 is an explanatory view of how to attach tool information to a tool in the working machine that performs the machining method according to an embodiment of the present invention.

FIG. 36 is a flowchart showing an operation to attach tool information to a tool and confirm the tool in the working machine that performs the machining method according to an embodiment of the present invention. FIG. 37 to FIG. 39 are explanatory views indicative of how to attach tool information to a tool in the working machine that performs the machining method according to an embodiment of the present invention. FIG. 40 to FIG. 43 are explanatory views indicative of how to confirm a tool in the working machine that performs the machining method according to an embodiment of the present invention.

First, in Step S400 in FIG. 36, a tool number and tool dimensions (correction values) are printed, by the label printer 314 shown in FIG. 37, to a label 333 in a matrix type two-dimensional code or the like that can be recognized by an image. Moreover, using a tag writer 315 shown in FIG. 37, information is written to a tag 334, such as an IC tag, which can be electrically read.

Then, in Step S410 in FIG. 36, by the tool's label/tag attaching unit 316, the tag 334 is attached to tools T310 and T315 as shown in FIG. 37. In FIG. 37, originally the label/tag should be attached to the correct tool T310, but here a case is shown where the label/tag is erroneously attached to the tool T315. FIG. 38 shows a state where the label 333 is attached to the tool. FIG. 39 shows a state where the tag 334 is attached to the tool.

Then, in Step S420 in FIG. 36, the tool information is read by the tool information read unit A317 shown FIG. 22. In Step S430, the read tool number and correction data are transferred. At this time, if there is no problem, a label or tag having correct information written thereto is attached to the correct tool as shown in FIG. 40, and the information will be managed correctly. However, for example, if due to a human error, a desired label or tag is attached to the wrong tool (T15), not to a predetermined tool (T10), then as shown in FIG. 41, wrong information will be associated with the tool.

However, a management system using a person or a label/tag cannot recognize this attachment error. In this embodiment, after this, tool information determination using the above-described image is performed.

That is, in Step S430 in FIG. 36, the tool image information acquisition unit B312b images a tool to acquire image information of the tool. Next, in Step S440 in FIG. 36, a tool having the label/tag attached thereto is determined by a tool information determination unit B (313b) using the image (a tool information determination unit A (313a) may be used via a network). If determined by the image, then as shown in FIG. 42, a tool having the label/tag currently attached thereto can be determined as the tool (T315).

However, with the determination by an image, only a fact that a tool is T315 can be recognized, but whether or not a correct label/tag is attached to the tool cannot be determined.

Then, in Step S450 in FIG. 36, the information read by the tool information read unit A317 and the information determined by the tool image information determination unit B313b are comprehensively determined by the comprehensive determination unit A345a. That is, as shown in FIG. 42, the tool number read by the tool information read unit A317 is T310 while the tool number determined by the tool image information determination unit B313b is T315 and therefore a disagreement between tools can be detected.

Next, in Step S460 in FIG. 36, the comprehensive information generation unit A346a generates comprehensive information by putting together the information recorded on the label/tag and the image information as shown in FIG. 43 and sends the same to the database. Here, because the label is a matrix type two-dimensional code or the like and the information written thereto can be read by an image, the information can be read and referred from the image without referring to the information read by the tool information read unit A via the database. That is, a tool number is already recorded on a label and therefore by comparing the read tool number with a tool number determined from the image of an actual tool, whether or not the tool is a desired tool can be determined.

Figure 44:
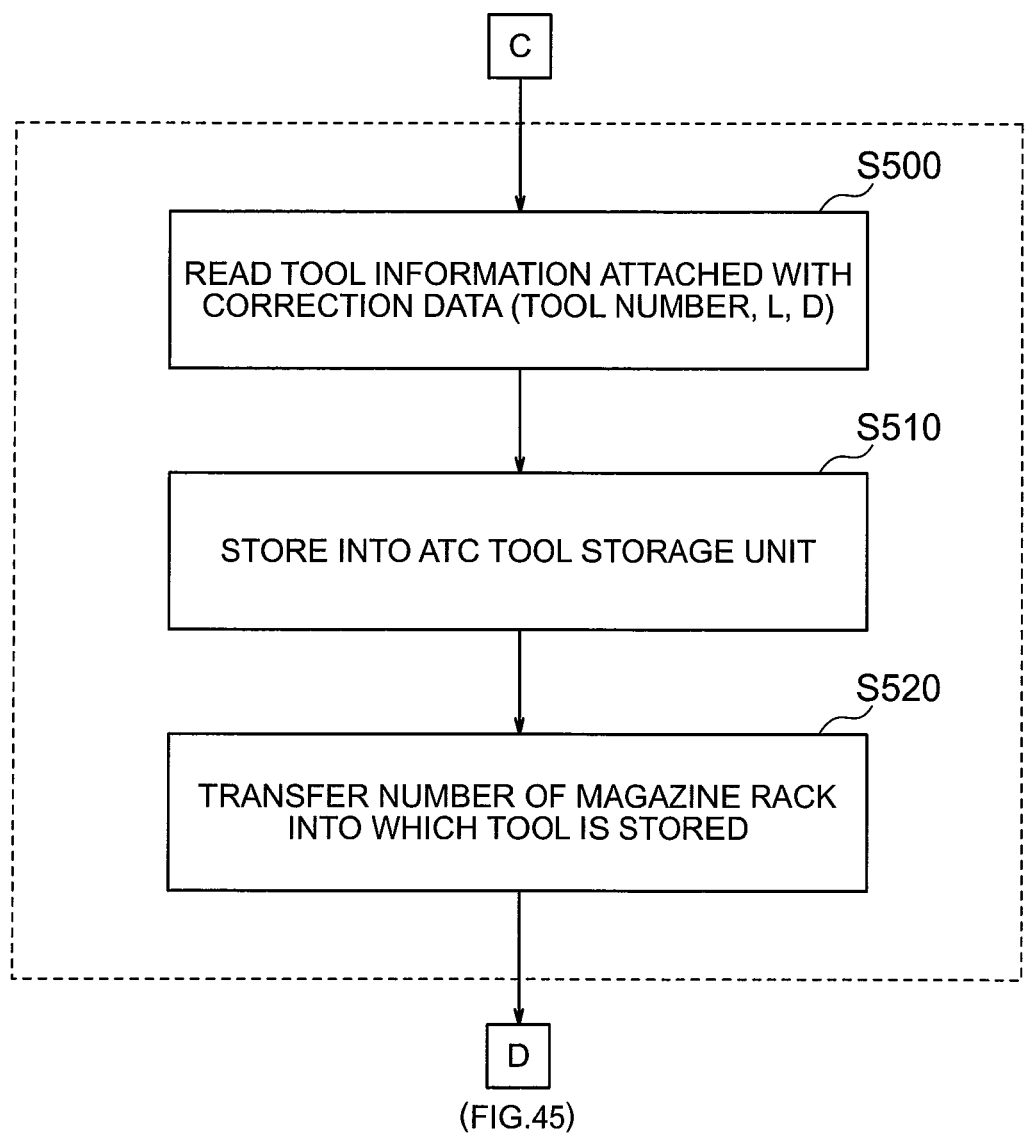
FIG. 44 is a flowchart showing an operation to store a tool in the working machine that performs the machining method according to an embodiment of the present invention.

Next, using FIG. 44, an operation to store a tool in the working machine that performs the machining method according to this embodiment is described.

FIG. 44 is a flowchart showing an operation to store a tool in the working machine that performs the machining method according to an embodiment of the present invention.

A tool is transported to the NC control working machine (MC) 344 attached with the automatic tool change unit (ATC) 318.

First, in Step S500, tool information is read by the tool information read unit B319. Then, in Step S510, the tool is stored into the tool storage unit 320. Furthermore, in Step S520, information regarding which rack of the tool storage unit 320 the relevant tool has been stored into is sent to the database 31 via the computer for ATC/MC 347. At this time, it is assured that a desired label/tag has been mounted on a desired tool, and therefore here, information regarding what number rack which tool has been stored into may need to be recognized.

Figure 45:
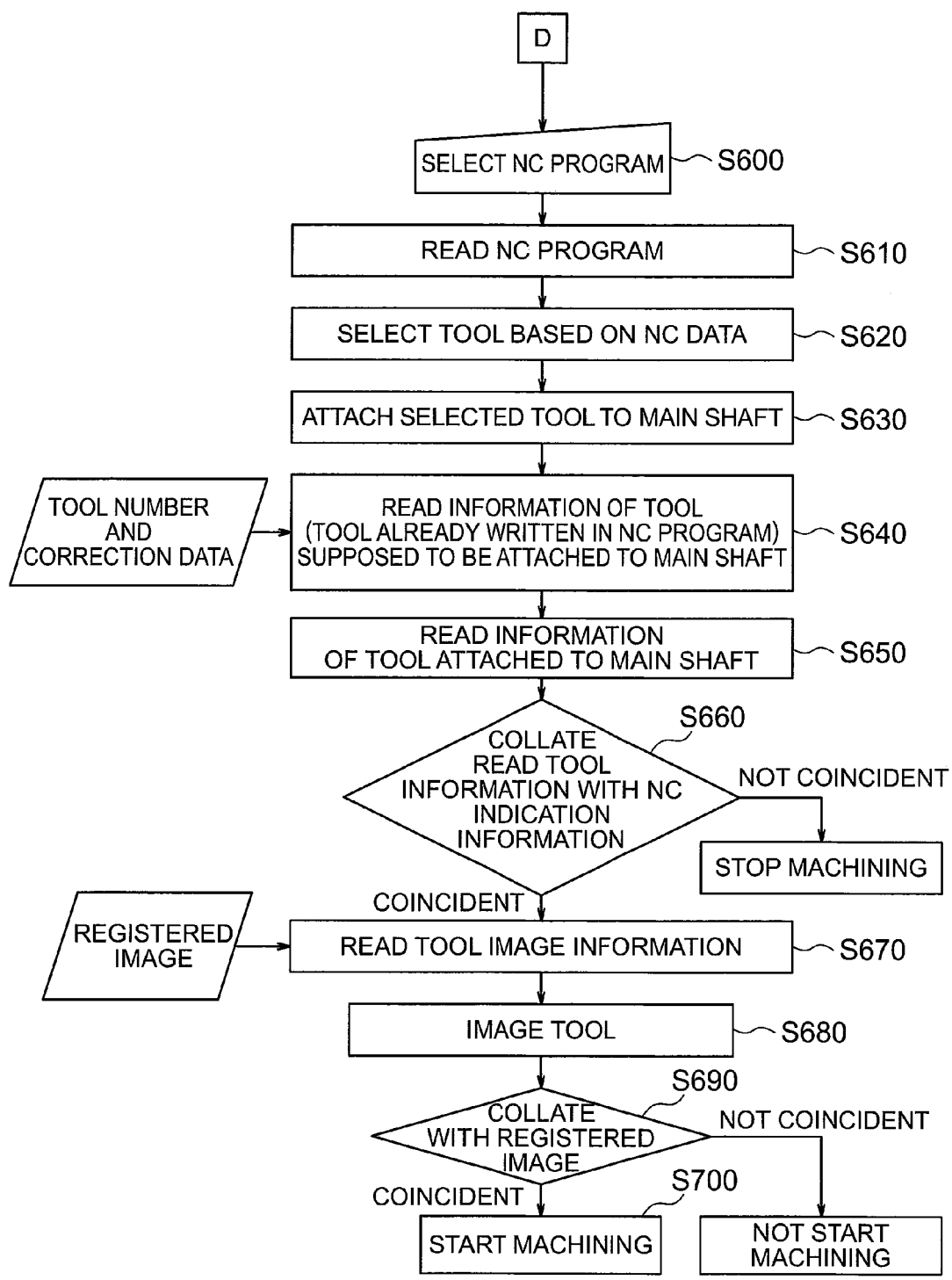
FIG. 45 is a flowchart showing the content of a machining procedure performed by the working machine that performs the machining method according to an embodiment of the present invention.

Next, using FIG. 45, a machining procedure by the working machine that performs the machining method according to this embodiment is described.

FIG. 45 is a flowchart showing the content of the machining procedure by the working machine that performs the machining method according to an embodiment of the present invention.

A workpiece 326 is prepared on a table 327.

Then, in Step S600, the operation of the NC control panel 331 is performed by a working machine operator to specify an NC program and the NC program is transferred via a communication terminal 332. Next, in Step S610, this information is sent to and read into the ATC control unit 322. Then, in Step S620, based on the read information, the ATC arm 321 selects a desired tool (Tool D, 325) inside the tool storage unit 320, and this tool is mounted on a main shaft 324 in Step S630.

Here, in Step S640 before starting machining, rear information that is supposed to be attached to the main shaft is read by the computer for ATC/MC 347. Moreover, in Step S650, tool information is read by a tool information read unit C329. Then, in Step S660, the information read in Step S640 and the information read in Step S650 are collated. Even if a wrong tool has been selected by ATC318, the tool information read unit C will notice that a wrong tool has been selected. Therefore, wrong cutting will not occur if the machining is stopped at the time when it has been detected that a wrong tool is mounted. However, at an actual machining site, a tool may be manually exchanged without via the ATC. In this case, as already described, only with the information of the tool information read unit C, whether or not a desired tool has been attached to the main shaft 325 cannot be reliably determined.

Then, in this embodiment, in Step S670, the tool information determination unit B313b reads the image information attached to the tool. Here, the image information of a tool to be read is the one acquired in advance, and is image information acquired by expanding an image, which is captured by rotating the tool from a position at 0 degree to 360 degrees, from 0 degree to 360 degrees in the rotation direction of the axis of rotation. Moreover, in Step S680, the tool image information acquisition unit C330 images a tool to acquire tool image information. The acquired tool image information is sent to the tool information determination unit B313b via a network.

Then, in Step S690, the tool information determination unit B313b can determine whether or not the tool is a desired tool, by collating the image information of Step S670 with the image information of Step S680. Here, the acquisition of the tool image information in Step S680 is performed by either of the following methods. In a first method, the main shaft 324 is not rotated, but at a position when a tool is initially attached to the main shaft 324, an image of the tool in the attached state is captured from one direction. In this case, in Step S690, the 360-degree expanded image information acquired in Step S670 is compared with the image information from one direction to determine whether or not the tool is a desired tool. In a second method, the main shaft 324 is slowly rotated from 0 degree to a predetermined angle (e.g., 90 degrees, 180 degrees, or the like), and an image of a tool in an attached state in a range from 0 degree to a predetermined angle is captured. In this case, in Step S690, the 360-degree expanded image information acquired in Step S670 is compared with the image information in a range from 0 degree to a predetermined angle to determine whether or not the tool is a desired tool. This method can improve the determination accuracy than the first method. In a third method, the main shaft 324 is rotated from 0 degree to 360 degrees, and an image of a tool in an attached state in a range from 0 degree to 360 degrees is captured. In this case, in Step S690, the 360-degree expanded image information acquired in Step S670 is compared with the image information in a range from 0 degree to 360 degrees to determine whether or not the tool is a desired tool. This method can improve the determination accuracy than the second method. In a fourth method, while the main shaft 324 is sequentially rotated from 0 degree, an image of a tool in an attached state is captured. In this case, in Step S690, the 360-degree expanded image information acquired in Step S670 is compared with the image information at each angle acquired while rotating the main shaft 324 from 0 degree, and the rotation is continued until the tool can be determined as a desired tool. This method can obtain the determination accuracy nearly equal to the third method, and in addition, can determine in a shorter time than the third method.

Then, if the tool is determined as a desired one, then in Step S700, a predetermined machining operation is specified by the control unit 328, and X, Y, and Z-axes 323 and the main shaft 324 operate to perform the predetermined machining operation.

According to this embodiment described above, because the collation is always performed with an image of a present tool, whether or not the present tool is a desired tool can be reliably determined Then, wrong cutting due to a tool-mounting error caused by a human error can be prevented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A laser projection method comprising:
   irradiating, from a laser projection unit, a laser on a workpiece at at least three different positions on the workpiece, which is a measurement object, by controlling respective angles of a plurality of mirrors;
   storing the angles at which each of the plurality of mirrors are disposed when each of the at least three different positions are irradiated on the workpiece;
   measuring three-dimensional coordinates of the at least three positions with a stereo camera;
   calculating a positional relationship between the laser projection unit and the workpiece by comparing the at least three three-dimensional coordinates with the stored angles of the plurality of mirrors;
   performing coordinate conversion of Computer Aided Design (CAD) data based on the positional relationship between the laser projection unit and the workpiece to generate data for irradiating the laser; and
   controlling the angles of the plurality of mirrors and irradiating the laser on the workpiece to draw on the workpiece based on the generated data for irradiating the laser.

2. The laser projection method according to claim 1, further comprising the steps of:
   comparing a three-dimensional coordinate of said CAD data with the three-dimensional coordinate of an actual contour of said workpiece and indicating this comparison result.

3. The laser projection method according to claim 2, wherein said comparison result is indicated on a display.

4. A laser projection apparatus comprising:
   a laser projection unit to irradiate a laser on a workpiece at at least three different positions on the workpiece, which is a measurement object, by respectively controlling a plurality of mirror angles;

a memory to store the angles at which of each of the plurality of mirrors are disposed when each of the at least three different positions are irradiated on the workpiece;

a coordinate calculation unit to measure three-dimensional coordinates of the at least three positions with a stereo camera;

a relative positional relationship calculation unit to calculate a positional relationship between the laser projection unit and the workpiece by comparing the at least three three-dimensional coordinates with the stored angles of the plurality of mirrors; and a CAD data conversion unit to perform coordinate conversion of Computer Aided Design (CAD) data based on the positional relationship between the laser projection unit and the workpiece to generate data for irradiating the laser, wherein the laser projection unit controls the angles of the plurality of mirrors and irradiates the laser on the workpiece to draw on the workpiece based on the generated data for irradiating the laser.

* * * * *